(12) United States Patent
Motohashi et al.

(10) Patent No.: US 11,168,190 B2
(45) Date of Patent: Nov. 9, 2021

(54) RANDOM MAT AND PRODUCTION METHOD THEREFOR, AND FIBER-REINFORCED RESIN MOLDING MATERIAL USING RANDOM MAT

(71) Applicant: Toray Industries, Inc., Tokyo (JP)

(72) Inventors: Tetsuya Motohashi, Nagoya (JP); Takafumi Hashimoto, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 254 days.

(21) Appl. No.: 16/341,054

(22) PCT Filed: Sep. 28, 2017

(86) PCT No.: PCT/JP2017/035143
§ 371 (c)(1),
(2) Date: Apr. 10, 2019

(87) PCT Pub. No.: WO2018/070254
PCT Pub. Date: Apr. 19, 2018

(65) Prior Publication Data
US 2019/0233604 A1    Aug. 1, 2019

(30) Foreign Application Priority Data

Oct. 12, 2016 (JP) .............................. JP2016-200755

(51) Int. Cl.
| | | |
|---|---|---|
| *C08J 5/24* | (2006.01) | |
| *B29B 15/08* | (2006.01) | |
| *D04H 1/72* | (2012.01) | |
| *D04H 1/732* | (2012.01) | |
| *C08J 5/04* | (2006.01) | |
| *B29K 307/04* | (2006.01) | |
| *B29K 105/12* | (2006.01) | |

(52) U.S. Cl.
CPC .................. *C08J 5/24* (2013.01); *B29B 15/08* (2013.01); *C08J 5/04* (2013.01); *D04H 1/72* (2013.01); *D04H 1/732* (2013.01); *B29K 2105/128* (2013.01); *B29K 2307/04* (2013.01); *C08J 2331/02* (2013.01)

(58) Field of Classification Search
CPC .. C08J 5/24; B29B 15/08; D04H 1/72; D04H 1/732

See application file for complete search history.

(56) References Cited

U.S. PATENT DOCUMENTS

| 10,569,986 B2 * | 2/2020 | Motohashi ............ B29B 15/105 |
|---|---|---|
| 2010/0178495 A1 | 7/2010 | Taketa et al. |
| 2017/0260345 A1 | 9/2017 | Bamba et al. |
| 2017/0355550 A1 | 12/2017 | Kawahara et al. |
| 2018/0094368 A1 | 4/2018 | Bamba et al. |
| 2019/0084186 A1 | 3/2019 | Motohashi et al. |

FOREIGN PATENT DOCUMENTS

| JP | 2008-174605 A | 7/2008 |
|---|---|---|
| JP | 2009-62474 A | 3/2009 |
| JP | 2009-114611 A | 5/2009 |
| JP | 2013-202890 A | 10/2013 |
| JP | 5672947 B2 | 2/2015 |
| WO | 2008/149615 A1 | 12/2008 |
| WO | 2016/043037 A1 | 3/2016 |
| WO | 2016/104154 A1 | 6/2016 |
| WO | 2016/158436 A1 | 10/2016 |
| WO | 2017/159263 A1 | 9/2017 |

OTHER PUBLICATIONS

WO 2008/149615 machine translation (Year: 2008).*

* cited by examiner

*Primary Examiner* — Edward J Cain
(74) *Attorney, Agent, or Firm* — DLA Piper LLP (US)

(57) ABSTRACT

A random mat includes a chopped fiber bundle [A] obtained by obliquely cutting a partially separated fiber bundle [B] prepared by alternately forming separation-processed sections, each of which is separated into a plurality of bundles, and not-separation-processed sections, along the lengthwise direction of a fiber bundle, wherein the total cross-sectional area of reinforcing fibers exhibits a specific change amount between both tips of the chopped fiber bundle [A]; a production method produces the random mat; and a fiber-reinforced resin molding material uses the random mat.

9 Claims, 13 Drawing Sheets

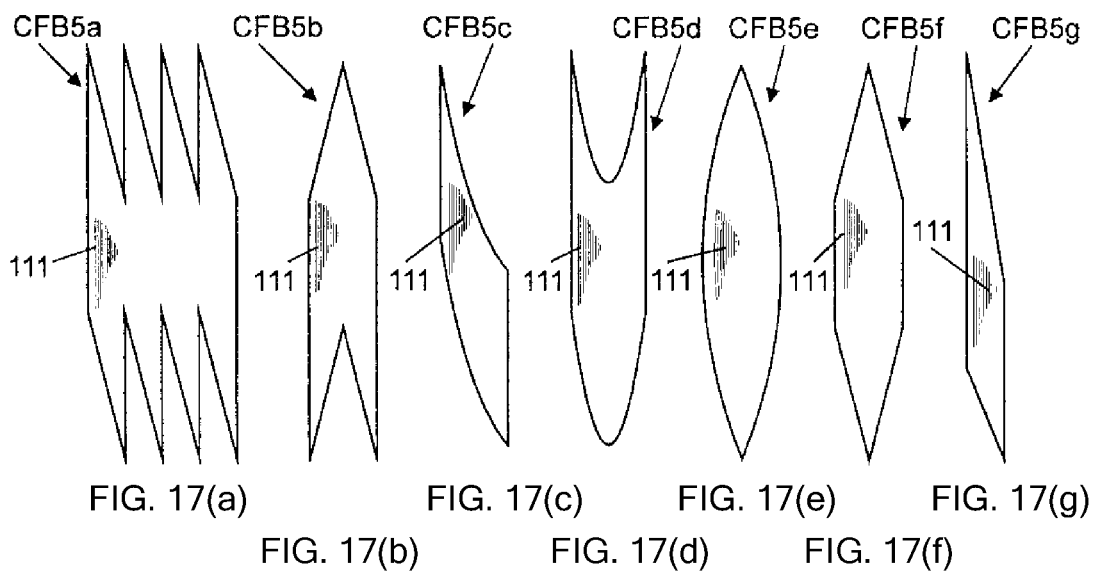
FIG. 17(a)  FIG. 17(c)  FIG. 17(e)  FIG. 17(g)
FIG. 17(b)  FIG. 17(d)  FIG. 17(f)
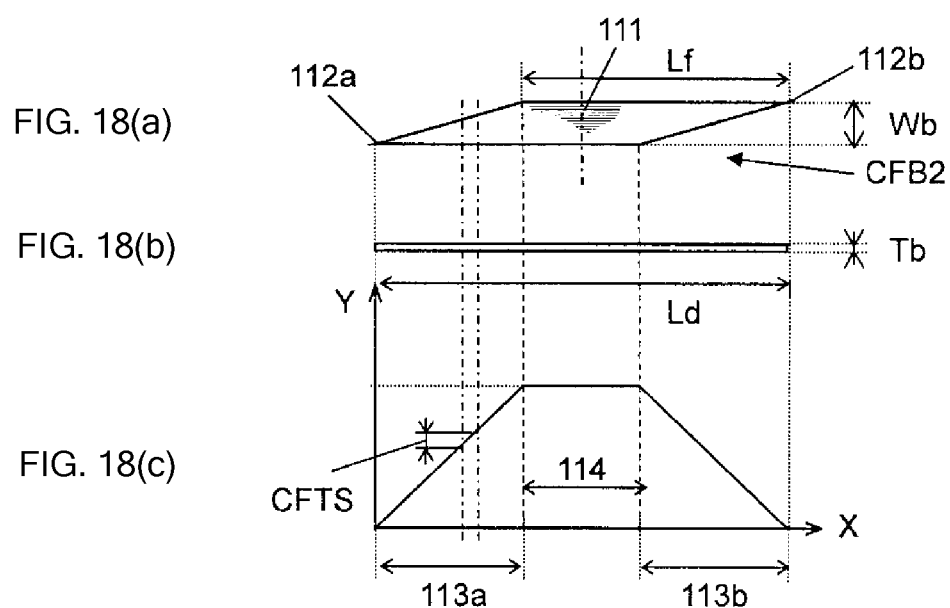
FIG. 18(a)
FIG. 18(b)
FIG. 18(c)

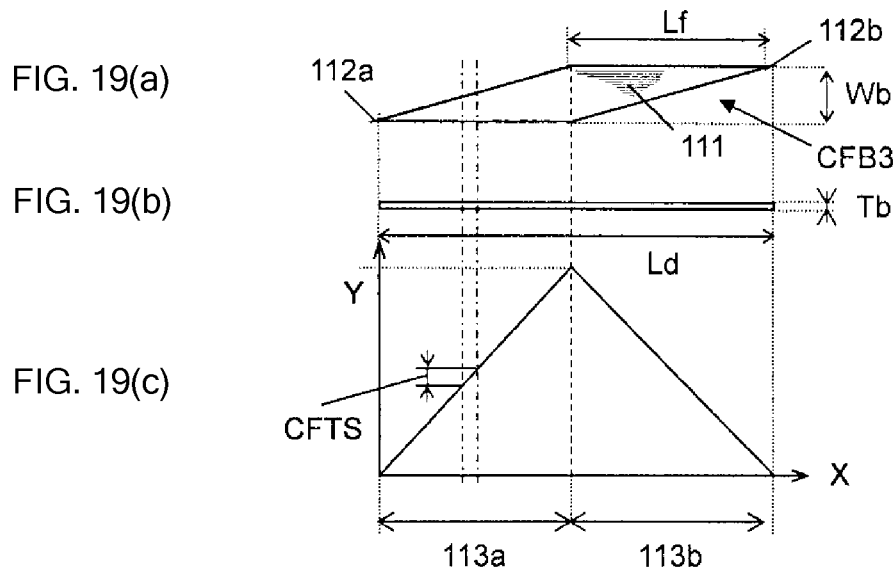
FIG. 19(a)
FIG. 19(b)
FIG. 19(c)
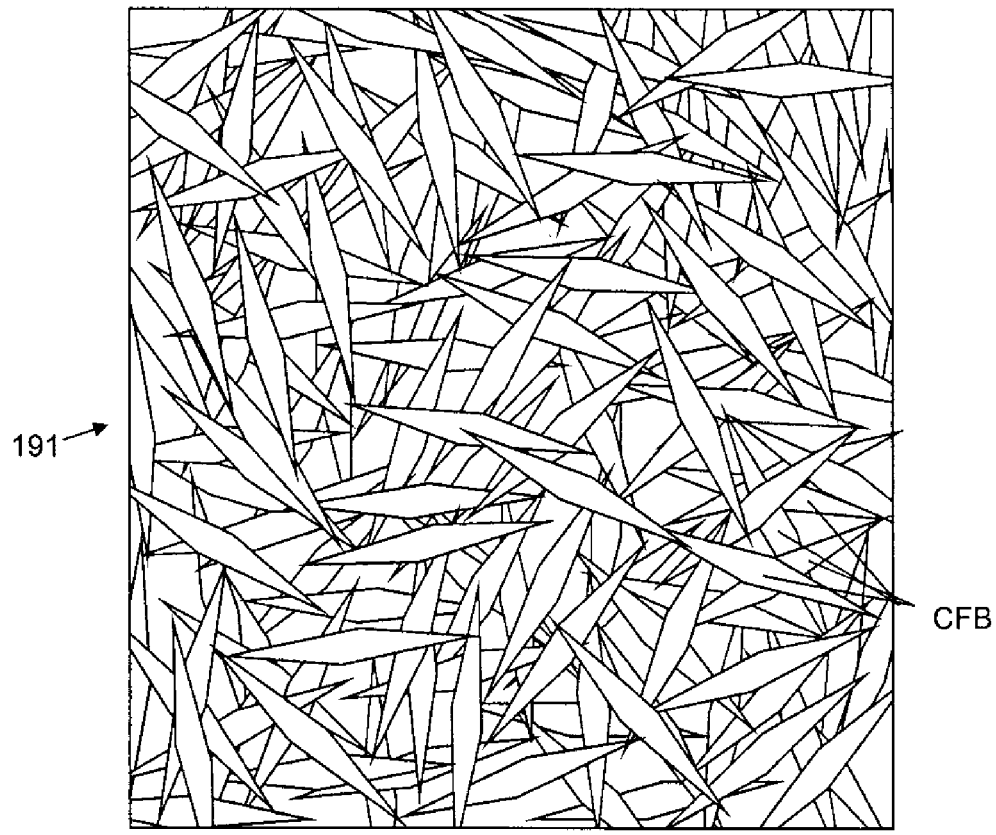
FIG. 20

RANDOM MAT AND PRODUCTION METHOD THEREFOR, AND FIBER-REINFORCED RESIN MOLDING MATERIAL USING RANDOM MAT

TECHNICAL FIELD

This disclosure relates to a random mat comprising a chopped fiber bundle of reinforcing fibers, a method of producing the random mat, and a fiber-reinforced resin molding material using the random mat.

BACKGROUND

Technology is known for molding a molded article having a desired shape by heating and pressurizing molding, using a fiber-reinforced resin molding material comprising a random mat comprising chopped fiber bundles which is randomly dispersed with fiber bundles of discontinuous reinforcing fibers (hereinafter, referred to as chopped fiber bundles) prepared by cutting a fiber bundle of continuous reinforcing fibers (for example, carbon fibers) and a matrix resin (for example, a thermosetting resin or a thermoplastic resin) (for example, JP 2013-202890A and JP 2008-174605 A). In such a conventional fiber-reinforced resin molding material, when the fiber bundle in the fiber-reinforced resin molding material is composed of a fiber bundle formed from a predetermined strand and having a predetermined number of single fibers, usually, in a molding material comprising a fiber bundle with a large number of single fibers, although the flowability during molding is excellent, the mechanical properties of a molded article tend to be inferior.

For example, in JP 2013-202890 A, a molding material in which the number of filaments of a chopped fiber bundle in the molding material is specified within a range of 10,000 to 700,000, is disclosed. In such a molding material, since the number of filaments of the fiber bundle is large, at the time of molding, reinforcing fibers can move efficiently in a form of a fiber bundle together with a resin so that an excellent flowability can be obtained, but with respect to a molded article after molding with this molding material, there is a high possibility that stress concentration occurs at the end portion of the fiber bundle and the like in the molded article, for example, when the molded article breaks and, therefore, it is not suitable for molding a molded article required with high mechanical properties.

On the other hand, for example, in JP 2008-174605 A, a fiber-reinforced resin using a fiber bundle that is separated so that the number of single fibers becomes 100 or less is disclosed, but compared to the structure disclosed in the above-described JP 2013-202890 A, since the number of single fibers of the fiber bundle is much smaller, the reinforcing fibers are well dispersed in a molded article, the possibility of stress concentration occurring at the end portion of the fiber bundle or the like in the molded article decreases, and the mechanical properties of the molded article are increased, on the other hand, a possibility is left that high flowability cannot be obtained at the time of molding as expected.

Thus, in a fiber-reinforced resin molding material using a fiber bundle having a relatively large number of single fibers, excellent productivity and excellent flowability during molding tend to be obtained, but the mechanical properties of a molded article tend to be inferior and, on the contrary, in a fiber-reinforced resin molding material using a fiber bundle having a relatively small number of single fibers, the mechanical properties of a molded article tend to be excellent, but it tends to be difficult to improve the flowability during molding.

Focusing on such a tendency, in WO 2016/043037, a fiber-reinforced resin molding material comprising at least bundled aggregates of discontinuous reinforcing fibers and a matrix resin is proposed wherein the bundled aggregate of the reinforcing fibers contains both of reinforcing fiber aggregates A formed by cutting a strand of continuous reinforcing fibers after subjecting the strand to a splitting treatment to completely divide the strand into a plurality of bundles, and reinforcing fiber aggregates B containing undivided portions not subjected to the splitting treatment or/and in which the splitting treatment is insufficient, at a predetermined proportion. That proposal makes it possible to achieve both of good flowability during molding and excellent mechanical properties of a molded article at a good balance. However, in the fiber-reinforced resin molding material described in WO 2016/043037, because the bundled aggregate of the discontinuous reinforcing fibers was basically formed by being cut in the direction perpendicular to the lengthwise direction of the fiber bundle, there is a possibility that a tendency is left in that a stress concentration is liable to occur at the end portion of the bundled aggregate in a molded article.

On the other hand, as another manner of achieving both of good flowability during molding and excellent mechanical properties of a molded article at a good balance Japanese Patent No. 5672947 describes a chopped fiber bundle in which transition sections each in which the number of reinforcing fibers changes toward each tip of the fiber bundle are provided at both end portions of the fiber bundle, and in which the change amount per unit length of the total cross-sectional area of reinforcing fibers in the cross section of the fiber bundle is suppressed to be small between both ends. However, since the chopped fiber bundle described in Japanese Patent No. 5672947 is obtained basically by cutting a continuous reinforcing fiber bundle in which a predetermined number of continuous reinforcing fibers are bundled, in particular, when the number of single fibers of the chopped fiber bundle is great and the fiber bundle is thick, there is also a possibility that a tendency is left in that a stress concentration is liable to occur at the end portion of the chopped fiber bundle in a molded article.

Thus, according to the proposals of WO 2016/043037 and Japanese Patent No. 5672947, improvements are being promoted to achieve both of good flowability during molding and excellent mechanical properties of a molded article at a good balance, but better flowability during molding, higher mechanical properties (strength, modulus of elasticity) of a molded article and further reduction of its variation are being required than those in these proposals.

It could accordingly be helpful to provide a random mat capable of achieving better flowability during molding, higher mechanical properties (strength, modulus of elasticity) of a molded article and further reduction of its variation compared to conventional technologies, a method of producing the same, and a fiber-reinforced resin molding material using the same.

SUMMARY

We thus provide a random mat comprising at least a chopped fiber bundle [A], and the chopped fiber bundle [A] satisfies at least the following (a) to (d):
(a) the chopped fiber bundle [A] is a bundled aggregate of discontinuous reinforcing fibers obtained by cutting a partially separated fiber bundle [B] prepared by alternately forming separation-processed sections, each of which is separated into a plurality of bundles, and not-separation-processed sections, along a lengthwise direction of a fiber bundle comprising a plurality of reinforcing fibers;

(b) the chopped fiber bundle [A] has a first transition section in which the number of the reinforcing fibers in a cross section of the fiber bundle in a direction perpendicular to the lengthwise direction of the fiber bundle is increased from a first tip which is one tip in the lengthwise direction of the fiber bundle, toward a second tip which is the other tip, and a second transition section in which the number of the reinforcing fibers in the cross section of the fiber bundle is increased from the second tip toward the first tip;

(c) between the first transition section and the second transition section, along the lengthwise direction of the fiber bundle, an unchanging section in which the number of the reinforcing fibers in the cross section of the fiber bundle is invariable is provided, and one end surface of the unchanging section coincides with a first terminal end surface which is a terminal end at a side opposite to the first tip of the first transition section and the other end surface of the unchanging section coincides with a second terminal end surface which is a terminal end at a side opposite to the second tip of the second transition section, or the first terminal end surface and the second terminal end surface coincide directly with each other; and (d) a change amount of the total cross-sectional area of the reinforcing fibers in the cross section of the fiber bundle between the first tip and the second tip is 0.05 mm$^2$ or less per a length of 1 mm in the lengthwise direction of the fiber bundle.

In such a random mat, the chopped fiber bundle [A] is a bundled aggregate of discontinuous reinforcing fibers obtained by cutting a partially separated fiber bundle [B] prepared by alternately forming separation-processed sections, each of which is separated into a plurality of bundles, and not-separation-processed sections, along a lengthwise direction of a fiber bundle comprising a plurality of reinforcing fibers, and which has a first transition section and a second transition section, each in which the number of the reinforcing fibers in a cross section of the fiber bundle in a direction perpendicular to the lengthwise direction of the fiber bundle is changed, in both end portion sides in the lengthwise direction of the fiber bundle. Namely, although in the fiber-reinforced resin molding material in WO 2016/043037, the bundled aggregate [A] of discontinuous reinforcing fibers was formed by being cut in the direction perpendicular to the lengthwise direction of the fiber bundle, in particular, a partially separated fiber bundle is obliquely cut to the lengthwise direction of the fiber bundle to have the first transition section and the second transition section. By being obliquely cut relative to the lengthwise direction of the fiber bundle, it becomes possible for the cutting plane to extend over the separation-processed section and the not-separated-processed section, whereby in particular the end portion of the formed bundled aggregate [A] is easily formed in a shape in which stress does not easily concentrate in a molded article (various examples will be described later) and, further, it becomes also possible to make the fiber bundle like the reinforcing fiber aggregate B in WO 2016/043037 smaller in width. Further, since the fiber bundle used to form the chopped fiber bundle [A] is the partially separated fiber bundle [B] in which the separation-processed sections and the not-separation-processed sections are alternately formed compared to the chopped fiber bundle obtained by cutting a continuous reinforcing fiber bundle in which a predetermined number of continuous reinforcing fibers are bundles such as the one in Japanese Patent No. 5672947, stress concentration is less likely to occur at the end portion of the chopped fiber bundle in a molded article. Furthermore, since between the first tip and the second tip of the chopped fiber bundle, the change amount of the total cross-sectional area of the reinforcing fibers in the cross section of the fiber bundle between the first tip and the second tip is suppressed to be small at 0.05 mm$^2$ or less per a length of 1 mm in the lengthwise direction of the fiber bundle, the stress concentration at the end portion of the chopped fiber bundle in a molded article can be prevented more effectively and smoothly. Namely, the state where the number of reinforcing fibers increases from a tip to an end of the transition section of the chopped fiber bundle [A] can be expressed conversely as a state where the number of reinforcing fibers decreases from the central portion of the chopped fiber bundle [A] toward a tip of the chopped fiber bundle [A]. By this state decreased with the number of reinforcing fibers, the occurrence of stress concentration in a molded article can be prevented. This state decreased with the number of reinforcing fibers is preferably a formation in which the number of reinforcing fibers decreases gradually, that is, continuously. If chopped fiber bundle [A] is thick, the number of reinforcing fibers is large, and the total cross-sectional area of reinforcing fibers is larger, the effect of preventing the occurrence of stress concentration will be greater. The larger the total cross-sectional area of the reinforcing fibers, the larger the load born by one chopped fiber bundle [A] in a molded article becomes, but even if the load to be born is large, the state where the load is delivered at a stroke to the end portion of an adjacent chopped fiber bundle [A] through a matrix resin can be effectively prevented by the state decreased with the number of reinforcing fibers in the transition section. Namely, the transmission of the load between adjacent chopped fiber bundles [A] is gradually performed due to the state where the number of reinforcing fibers in the transition section is decreased, in particular, the state without a sudden change in the number, the stress concentration at the end portion of the chopped fiber bundle [A] is more effectively prevented, and the occurrence of stress concentration over the entire chopped fiber bundle [A] is more effectively prevented. As a result, it becomes possible to exhibit higher mechanical properties (strength, elastic modulus) and to further reduce variations in the mechanical properties in a molded article. With respect to good flowability during molding, it is ensured by a condition where the partially separated fiber bundle is cut into a chopped fiber bundle [A] which is a bundled aggregate of discontinuous reinforcing fibers.

In the above-described random mat, it is sufficient that the chopped fiber bundle [A] satisfying the above-described (a) to (d) is contained, and a chopped fiber bundle not satisfying all of (a) to (d) (for example, a chopped fiber bundle in which the above-described (a) is satisfied, and in the above-described (d), between the first tip and the second tip, the change amount of the total cross-sectional area of the reinforcing fibers in the cross section of the fiber bundle exceeds 0.05 mm$^2$ per a length of 1 mm in the lengthwise direction of the fiber bundle, and the above-described (b) and (c) are not satisfied, or are satisfied) may be contained in a range which does not damage the desired effect.

In the above-described random mat, a formation may be employed wherein in the partially separated fiber bundle [B], an entangled part in which the reinforcing fibers are entangled at least at one end of at least one of the separation-processed sections, and/or an entanglement accumulation part in which the entangled parts are accumulated, is formed.

Further, in the random mat, a formation may be employed wherein bundled aggregates of the discontinuous reinforcing fibers obtained by cutting the partially separated fiber bundle [B] are classified into at least the following aggregates [X] to [Z], and the chopped fiber bundle [A] comprises at least one of the aggregates [X], [Y] and [Z]:

aggregate [X]: a separated bundle aggregate divided into arbitrary number of bundles by separation processing;
aggregate [Y]: a joined bundle aggregate in which the reinforcing fibers of fiber bundles are joined to each other by being formed with the not-separation-processed section, and/or an entangled part in which the reinforcing fibers are entangled at least at one end of at least one of the separation-processed sections, and/or an entanglement accumulation part in which the entangled parts are accumulated; and
aggregate [Z]: a joined cut aggregate in which a cutting plane at cutting of the partially separated fiber bundle is intersected with the not-separation-processed section and/or the entangled part and/or the entanglement accumulation part, and at an intersected part, the joining of the reinforcing fibers of fiber bundles to each other is cut.

In this formation, it is preferred that the content of the joined bundle aggregate [Y] in the bundled aggregates of the discontinuous reinforcing fibers obtained by cutting the partially separated fiber bundle [B] is 0 to 15%. Namely, the joined bundle aggregate [Y] may not be contained, but in being contained, it is preferred to suppress the content at 15% at highest.

We also provide a method of producing a random mat as described above. Namely, a method of producing a random mat is a method of producing a random mat as described above, wherein the partially separated fiber bundle [B] is cut at an angle θ (3°≤θ≤30°) with respect to the lengthwise direction of the fiber bundle when obtaining the chopped fiber bundle [A].

In this method of producing a random mat, it is preferred that the partially separated fiber bundle [B] is cut to satisfy equation (1) when obtaining the chopped fiber bundle [A].

$$W \cdot \cos \theta / D \geq 3 \qquad (1)$$

W: width of fiber bundle when cutting partially separated fiber bundle
D: distance between cutting planes in chopped fiber bundle [A]

Furthermore, we provide a fiber-reinforced resin molding material comprising the above-described random mat and a matrix resin [M].

According to the random mat and its production method and the fiber-reinforced resin molding material using the same, by having the specific chopped fiber bundle [A] of the discontinuous reinforcing fibers formed by cutting the partially separated fiber bundle [B] prepared by alternately forming separation-processed sections and not-separation-processed sections, obliquely with respect to the lengthwise direction of the fiber bundle, excellent flowability during molding can be realized, extremely high mechanical properties (strength, elastic modulus) when made into a molded article can be realized, and variations in the mechanical properties can be suppressed to be small.

BRIEF DESCRIPTION OF THE DRAWINGS

FIGS. 17(a)-17(g) are schematic plan views showing further various examples of a chopped fiber bundle [A].

FIGS. 18(a)-18(c) show a plan view (a), a side view (b) and a graph (c) showing a state of increase/decrease of the number of reinforcing fibers in the arrangement direction of reinforcing fibers of a chopped fiber bundle, of the chopped fiber bundle [A] shown in FIG. 15.

FIGS. 19(a)-19(c) show a plan view (a), a side view (b) and a graph (c) showing a state of increase/decrease of the number of reinforcing fibers in the arrangement direction of reinforcing fibers of a chopped fiber bundle, of the chopped fiber bundle [A] shown in FIG. 16.

FIG. 20 is a schematic plan view showing an example of a fiber-reinforced resin molding material.

EXPLANATION OF SYMBOLS

Figure 1:
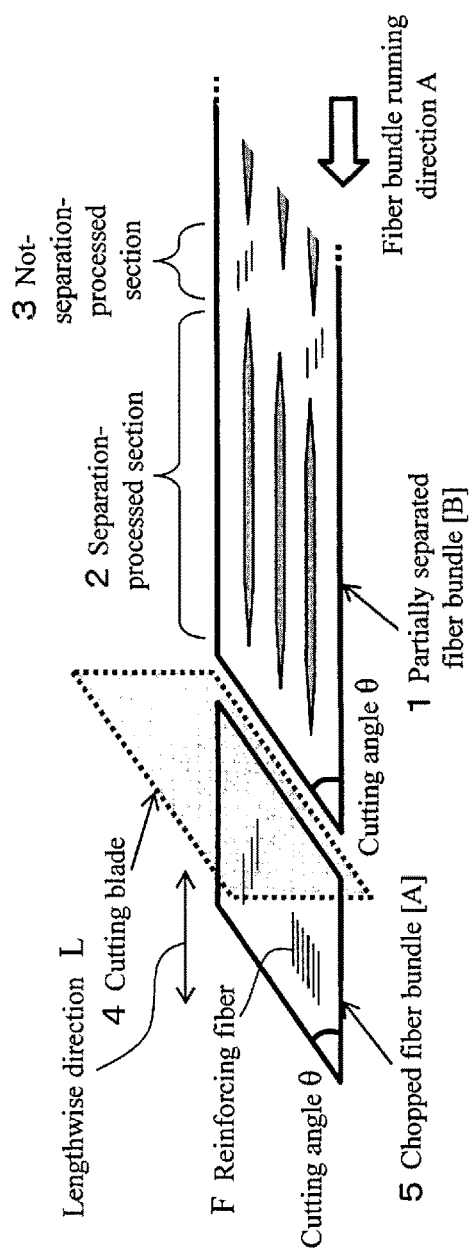
FIG. 1 is a schematic perspective view showing a partially separated fiber bundle [B] and a cutting example thereof.

1: 1, 17, 31, 41, 51, 61, 71, 81, 91, 212: partially separated fiber bundle [B]
2, 13, 15, 23, 32, 42, 64, 74: separation-processed section
3, 14, 16, 28, 33, 52, 62, 72, 82: not-separation-processed section
4: cutting blade
5: chopped fiber bundle [A]
11, 25, 63: entangled part
12, 26, 73: entanglement accumulation part
20: fiber bundle
21: separation means
22: protrusion
24: contact portion 27: fluff accumulation
34, 35, 43, 53, 65, 75, 83, 92: cutting plane
36, 37: bundled aggregate
F, 111: reinforcing fiber
112a: first tip
112b: second tip
113a: first transition section
113b: second transition section
113Ea: first terminal end surface of transition section
113Eb: second terminal end surface of transition section
114: unchanging section
114Ea: one end surface of unchanging section
115a: one side of first transition section
115b: one side of second transition section
116a: the other side of first transition section
116b: the other side of second transition section
191: fiber-reinforced resin molding material
201: continuous reinforcing fiber bundle
202: bobbin
203, 204: guide roller
205: roller cutter
206: sizing agent applying device
207: sizing agent supplying port
208: slit-shaped nozzle
209: molding base material
210: robot arm
211: partial separation processing device
θ: cutting angle
L: lengthwise direction
CFB, CFB1, CFB2, CFB3, CFB5a-CFB5g: chopped fiber bundle [A]
CFTS: change amount of total cross-sectional area of reinforcing fibers
Ld: passing length of chopped fiber bundle [A]
Lf: fiber length of reinforcing fiber
Tb: maximum thickness of chopped fiber bundle [A]
Wb: maximum width of chopped fiber bundle [A]
Wd: passing width of chopped fiber bundle [A]

DETAILED DESCRIPTION

Hereinafter, methods, mats and molding materials will be explained in detail with reference to the drawings, together with examples.

First, the partially separated fiber bundle [B] will be explained. Referring to FIG. 1, a partially separated fiber bundle [B] 1, prepared by alternately forming separation-processed sections 2, each of which is separated into a plurality of bundles, and not-separation-processed sections 3, along a lengthwise direction L of a fiber bundle comprising a plurality of reinforcing fibers F, and its cutting, will be explained. As shown in FIG. 1, the partially separated fiber bundle [B] 1, prepared by alternately forming separation-processed sections 2 and not-separation-processed sections 3 along the lengthwise direction L of the fiber bundle, is run in the direction A, and the partially separated fiber bundle [B] 1 is cut by a cutting blade 4 in a direction traversing the fiber bundle to form a chopped fiber bundle [A] 5 comprising bundled aggregates of discontinuous reinforcing fibers. As a preferable example of a method of obtaining the chopped fiber bundle [A] 5, exemplified is a method of cutting at an angle θ with respect to the lengthwise direction of the fiber bundle. This cutting angle θ is set, for example, at $3° \leq \theta \leq 30°$, and it is set to be a cutting in an oblique direction. Within such a range of cutting angle θ, it becomes possible to realize good flowability during molding and high mechanical properties of a molded article and its low variation.

Figure 2:
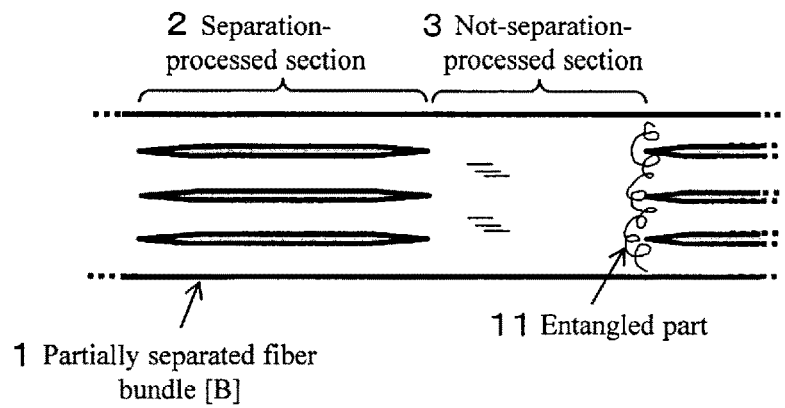
FIG. 2 is a schematic plan view of a fiber bundle showing an example of a partially separated fiber bundle [B].
Figure 3:
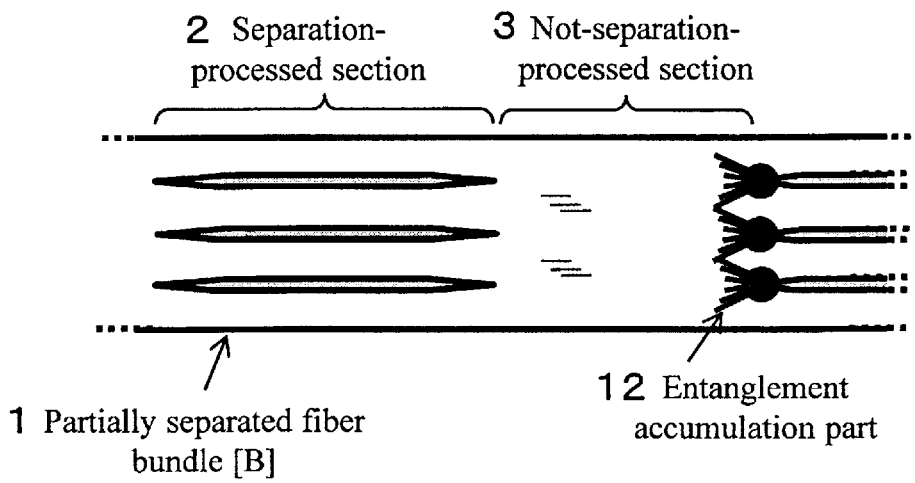
FIG. 3 is a schematic plan view of a fiber bundle showing another example of a partially separated fiber bundle [B].

Although the above-described partially-separated fiber bundle [B] 1 before cutting basically has a form in which separation-processed sections 2 and not-separation-processed sections 3 as shown in FIG. 1 are alternately formed along the lengthwise direction of the fiber bundle, as shown in FIG. 2 or 3, an example, wherein an entangled part 11 in which reinforcing fibers are entangled with each other and/or an entanglement accumulation part 12 in which the entangled parts are accumulated in at least one end portion of at least one separation-processed section 2, can be also employed.

Figure 4:
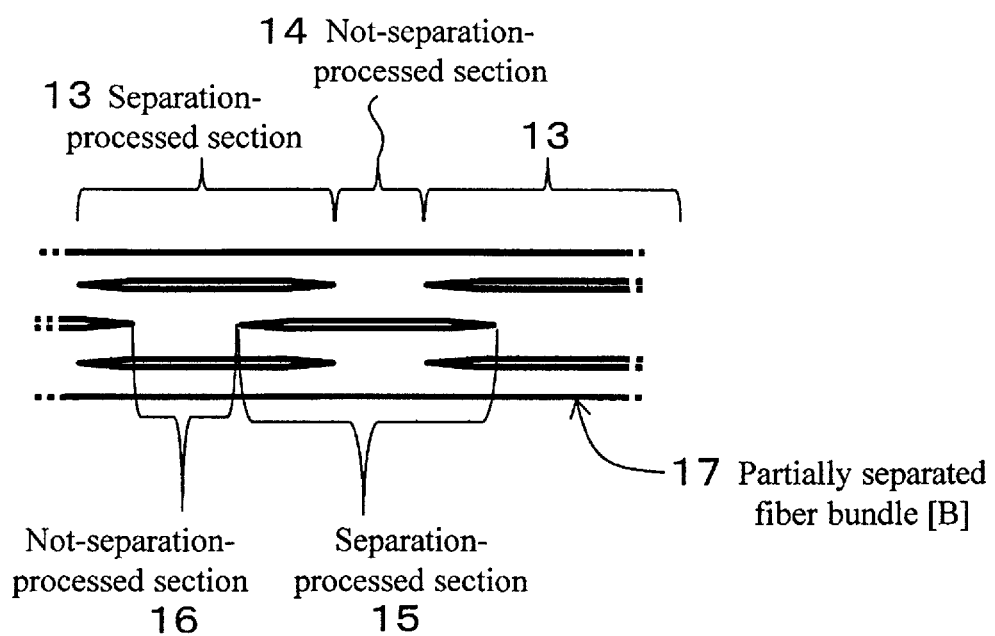
FIG. 4 is a schematic plan view of a fiber bundle showing a further example of a partially separated fiber bundle.

Further, as shown in FIG. 4, a partially separated fiber bundle [B] 17 according to an example comprising a combination of a formation in which the separation-processed sections 13 and the not-separation-processed sections 14 are alternately formed along the lengthwise direction of the fiber bundle and a formation in which the separation-processed sections 15 and the not-separation-processed sections 16 are alternately formed along the lengthwise direction of the fiber bundle, and wherein the separation-processed sections 15 of one formation are formed to extend over the not-separation-processed sections 14 of the other formation, is also included in the partially separated fiber bundle.

Figures 5A, 5B:
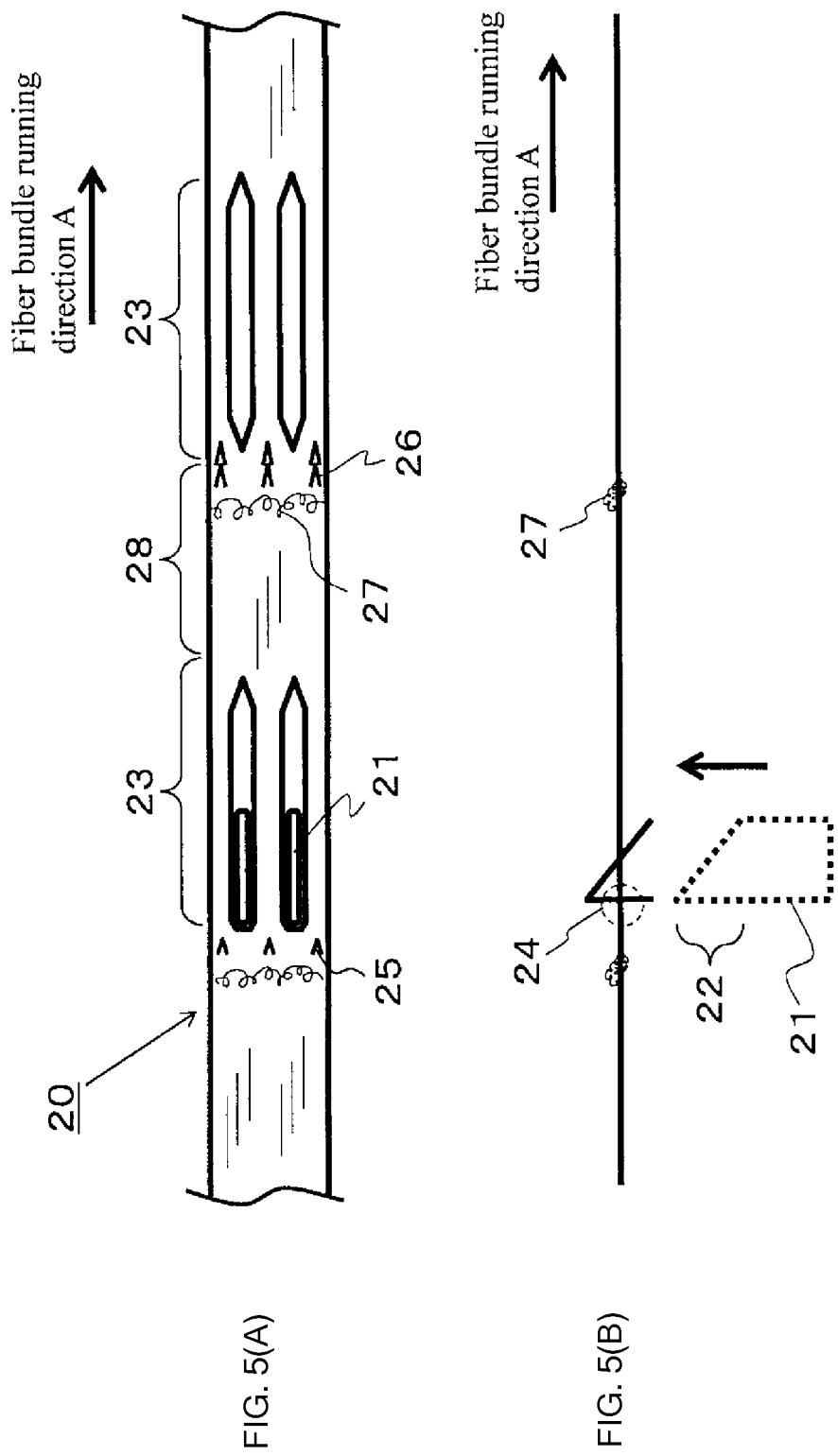
FIGS. 5(A) and 5(B) show a schematic plan view (A) and a schematic side view (B) showing an example of a method of manufacturing a partially separated fiber bundle [B].

The partially separated fiber bundle [B] as described above is formed, for example, as shown in FIGS. 5(A) and 5(B), although it is not particularly limited. FIGS. 5(A) and 5(B) are a schematic plan view (A) and a schematic side view (B) showing an example in which a separation means 21 is pierced into a running fiber bundle 20. The running direction A of the fiber bundle (the arrow) in the figure is the lengthwise direction of the fiber bundle 20, indicating that the fiber bundle 20 is continuously supplied from a fiber bundle supply device (not shown). The separation means 21 has a protrusion 22 having a protruding shape which is easy to be pierced into the fiber bundle 20, is pierced into the running fiber bundle 20, and generates separation-processed sections 23 substantially parallel to the lengthwise direction of the fiber bundle 20. Depending on the number of fiber bundles to be separated, it is also possible to simultaneously use a plurality of separation means 21. It is possible to arbitrarily arrange a plurality of protrusions 22 by a manner such as arranging a plurality of separation means 21 in parallel, by turns, or by shifting the phase.

When the fiber bundle 20 comprising a plurality of reinforcing fibers is divided into separated bundles having a lesser number of reinforcing fibers by the separation means 21, there is a possibility that, because a plurality of reinforcing fibers are not aligned substantially in the fiber bundle 20, but in single fiber level there are many portions where the fibers are entangled with each other, entangled parts 25, each in which reinforcing fibers are entangled with each other, may be formed in the vicinity of contact part 24 during the separation treatment. "Forming the entangled part 25" means, for example, forming (moving) the entanglement of reinforcing fibers having existed beforehand in the separation-processed sections in the contact part 24 by the separation means 21, forming (manufacturing) an aggregate newly entangled with reinforcing fibers by the separation means 21 or the like.

After creating separation-processed sections 23 in an arbitrary range, the separation means 21 is pulled out from the fiber bundle 20. By this pulling out, separation-processed sections 23 subjected to the separation processing are created, and at the same time entanglement accumulation parts 26 accumulated with entangled parts 25 are created. Further, fluffs generated from the fiber bundle during the separation processing may form a fluff accumulation 27 near the entanglement accumulation part 26 at the time of the separation processing.

Thereafter, by piercing the separation means 21 again into the fiber bundle 20, a not-separation-processed section 28 is created.

Figure 6:
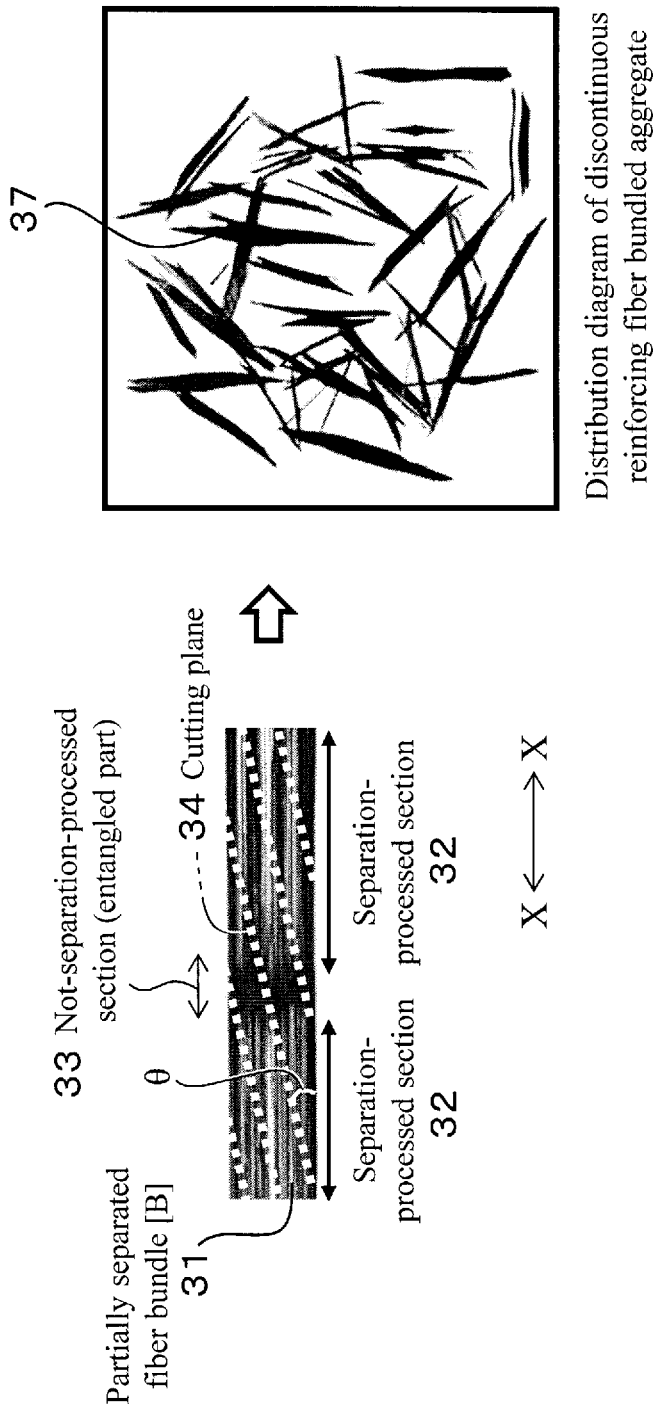
FIG. 6 is a schematic plan view of a partially separated fiber bundle [B] showing a basic technical concept of oblique cutting.
Figure 7:
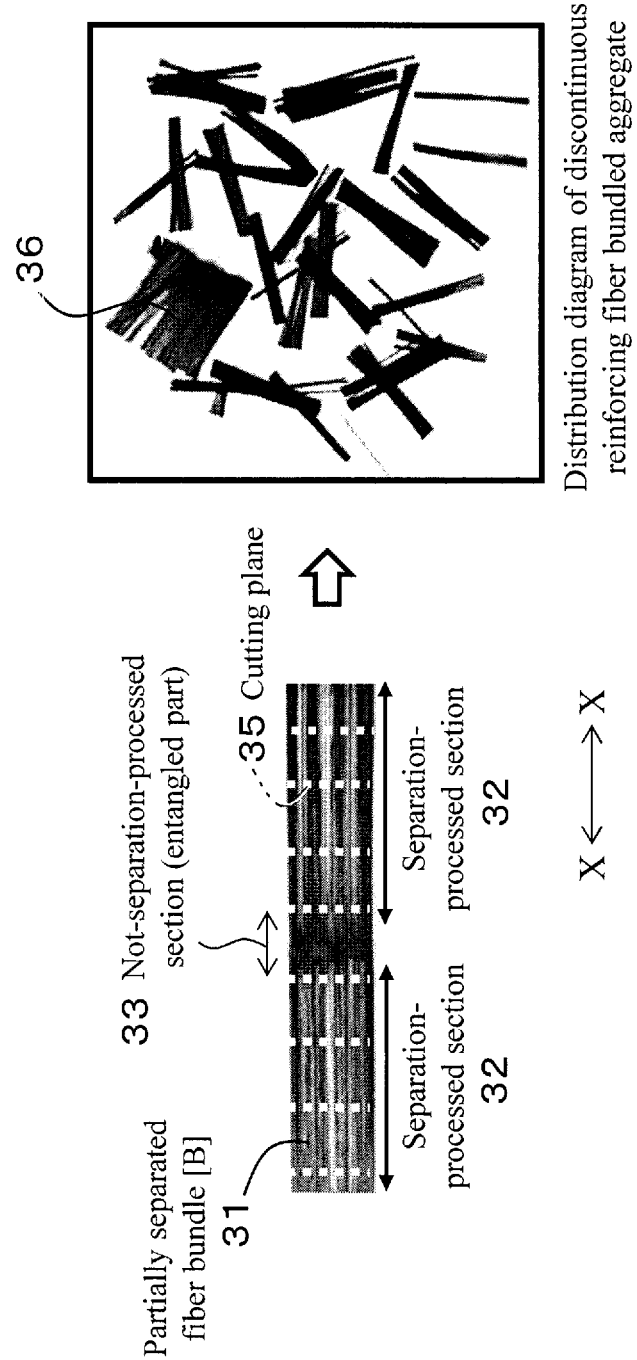
FIG. 7 is a schematic plan view of a partially separated fiber bundle [B] showing an example of orthogonal cutting.

Next, in FIG. 6, the basic technical concept employing the oblique cutting of a partially separated fiber bundle [B] will be explained compared to FIG. 7 employing the orthogonal cutting of a partially separated fiber bundle [B]. In FIGS. 6 and 7, symbol 31 denotes a partially separated fiber bundle [B] wherein along the lengthwise direction of a fiber bundle comprising a plurality of reinforcing fibers, separation-processed sections 32 each of which is separated into a plurality of bundles and not-separation-processed sections 33 containing the aforementioned entangled part and the like are alternately formed. In FIG. 7, the cutting plane 35 for the partially-separated fiber bundle [B] 31 is set in a direction (90° direction) orthogonal to the lengthwise direction X-X of the fiber bundle, whereas in our fiber bundles, the angle θ of the cutting plane 34 with respect to the lengthwise direction X-X of the fiber bundle is set at an angle θ (preferably, 3°≤θ≤30°) in an oblique direction.

Then, when burning off a matrix resin [M] from a molded article molded by randomly dispersing a fiber-reinforced resin molding material containing chopped fiber bundles [A] that are bundled aggregates of discontinuous reinforcing fibers obtained by the above-described cutting, and the matrix resin [M], heating and pressing, and leaving only the bundled aggregates of discontinuous reinforcing fibers to observe them as a plan view, the distribution diagrams of discontinuous reinforcing fiber bundled aggregates, for example, as exemplified in the right sides of FIGS. 6 and 7, are obtained. In the distribution diagram shown in FIG. 7, bundled aggregates 36, formed by cutting at both sides of not-separation-processed sections 33 containing mainly entangled parts at cutting planes 35 and in which the end portions in the lengthwise direction of the fiber bundle are relatively wide and formed as end portions extending in the direction orthogonal to the lengthwise direction of the fiber bundle, are left substantially in forms similar to their original forms. In such end portions of bundled aggregates 36, as aforementioned, a stress concentration is liable to occur, and it causes a decrease in the mechanical properties of the molded article and its variation. On the other hand, in the distribution diagram shown in FIG. 6, there is no such bundled aggregate 36 in which stress concentration is liable to occur and, for example, even in bundled aggregates 37 formed by cutting obliquely including non-separation treatment sections 33 containing entangled parts, each bundled aggregate 37 has a relatively narrow width and becomes narrower as it goes to the end portion and, besides, it is formed in the form of a bundled aggregate which does not have an end portion where stress concentration is liable to occur as in the bundled aggregate 36. Therefore, it becomes possible to improve the mechanical properties of the molded article and to reduce the variation of the mechanical properties.

The bundled aggregate of discontinuous reinforcing fibers obtained by cutting the partially separated fiber bundle [B] as described above is classified, for example, into at least the following aggregates [X]-[Z], the chopped fiber bundle [A] can be formed as a formation comprising at least one of the aggregates [X], [Y] and [Z]:

aggregate [X]: a separated bundle aggregate divided into arbitrary number of bundles by separation processing;

aggregate [Y]: a joined bundle aggregate in which the reinforcing fibers of fiber bundles are joined to each other by being formed with the not-separation-processed section, and/or an entangled part in which the reinforcing fibers are entangled at least at one end of at least one of the separation-processed sections, and/or an entanglement accumulation part in which the entangled parts are accumulated; and aggregate [Z]: a joined cut aggregate in which a cutting plane at cutting of the partially separated fiber bundle is intersected with the not-separation-processed section and/or the entangled part and/or the entanglement accumulation part, and at an intersected part, the joining of the reinforcing fibers of fiber bundles to each other is cut.

Figure 8:
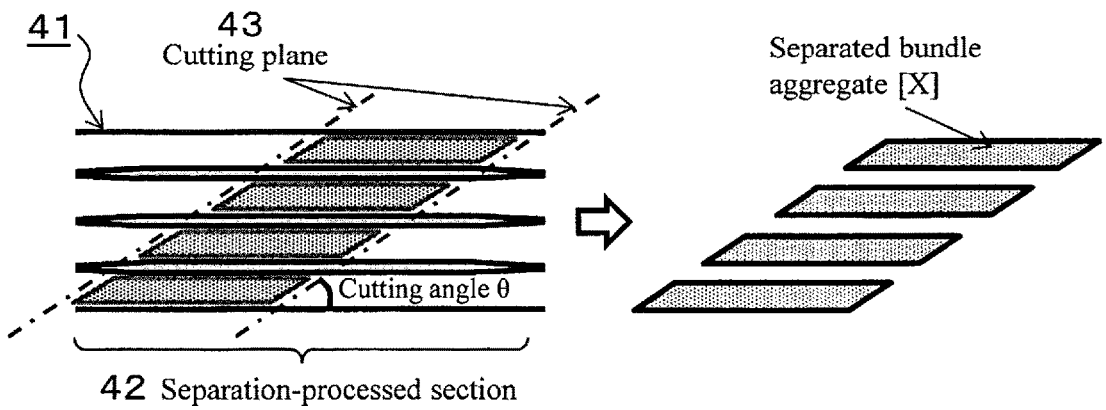
FIG. 8 is a schematic plan view showing an example of a method of manufacturing a separated bundle aggregate [X].

The above-described separated bundle aggregate [X] is, for example, as shown in FIG. 8, formed as a separated bundle aggregate [X] having a small width and a predetermined length at a formation of an arbitrary plural formation by being cut at cutting planes 43 oblique with respect to the lengthwise direction of the fiber bundle at a cutting angle θ (preferably, 3°≤θ≤30°) within the separation-processed section 42 of the partially separated fiber bundle 41.

Figure 9:
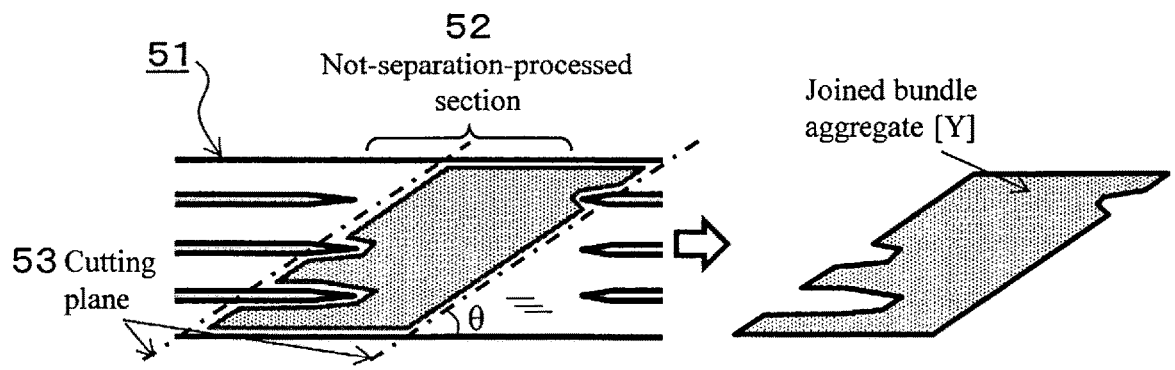
FIG. 9 is a schematic plan view showing an example of a method of manufacturing a joined bundle aggregate [Y].
Figure 10:
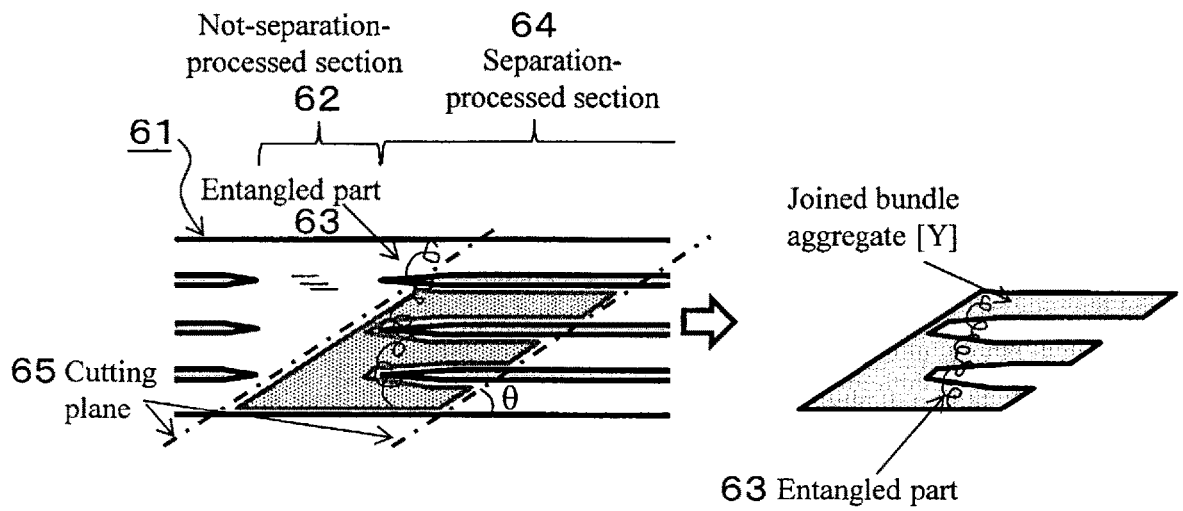
FIG. 10 is a schematic plan view showing another example of a method of manufacturing a joined bundle aggregate [Y].
Figure 11:
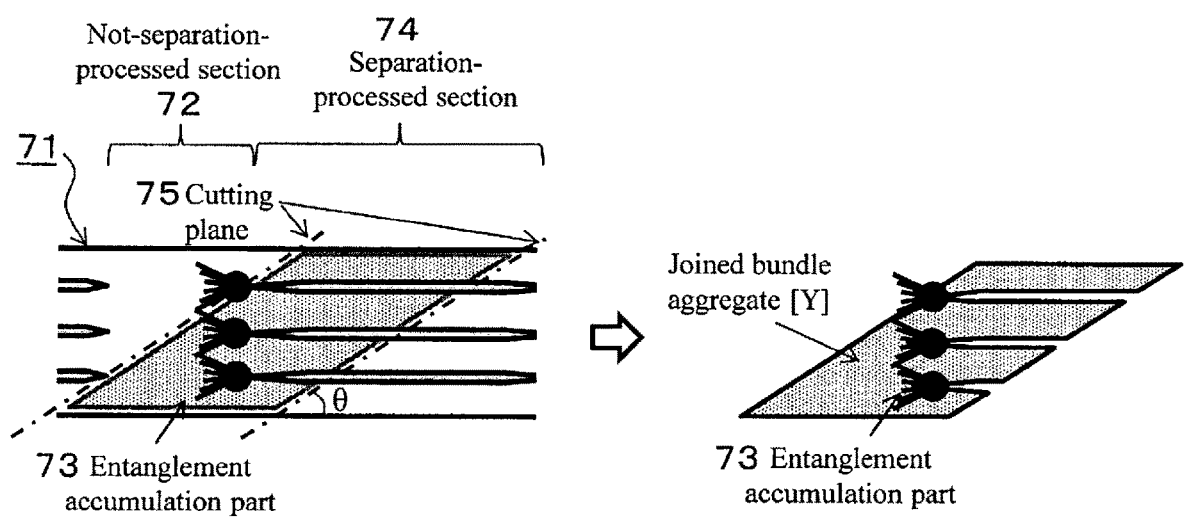
FIG. 11 is a schematic plan view showing a further example of a method of manufacturing joined bundle aggregate [Y].

As an example of the above-described joined bundle aggregate [Y], the joined bundle aggregate [Y] is, for example, as shown in FIG. 9, formed as a joined bundle aggregate [Y] such as one made with an incision at an end portion in the lengthwise direction of the fiber bundle, by being cut at cutting planes 53 oblique with respect to the lengthwise direction of the fiber bundle at a cutting angle θ (preferably, 3°≤θ≤30°) mainly within the not-separation-processed section 52 of the partially separated fiber bundle [B] 51. Alternatively, the joined bundle aggregate [Y] is, for example, as shown in FIG. 10, formed as a joined bundle aggregate [Y] such as one made with a deep incision at an end portion in the lengthwise direction of the fiber bundle and having an entangled part 63, by being cut at cutting planes 65 oblique with respect to the lengthwise direction of the fiber bundle at a cutting angle θ (preferably, 3°≤θ≤30°) over the not-separation-processed section 62 and the separation-processed section 64 having the entangled part 63 at the end portion of the partially separated fiber bundle [B] 61. Alternatively, the joined bundle aggregate [Y] is, for example, as shown in FIG. 11, formed as a joined bundle aggregate [Y] such as one made with a deep incision at an end portion in the lengthwise direction of the fiber bundle and having an entanglement accumulation part 73, by being cut at cutting planes 75 oblique with respect to the lengthwise direction of the fiber bundle at a cutting angle θ (preferably, 30≤θ≤30≤) over the not-separation-processed section 72 and the separation-processed section 74 having the entanglement accumulation part 73 at the end portion of the partially separated fiber bundle [B]71.

Figure 12:
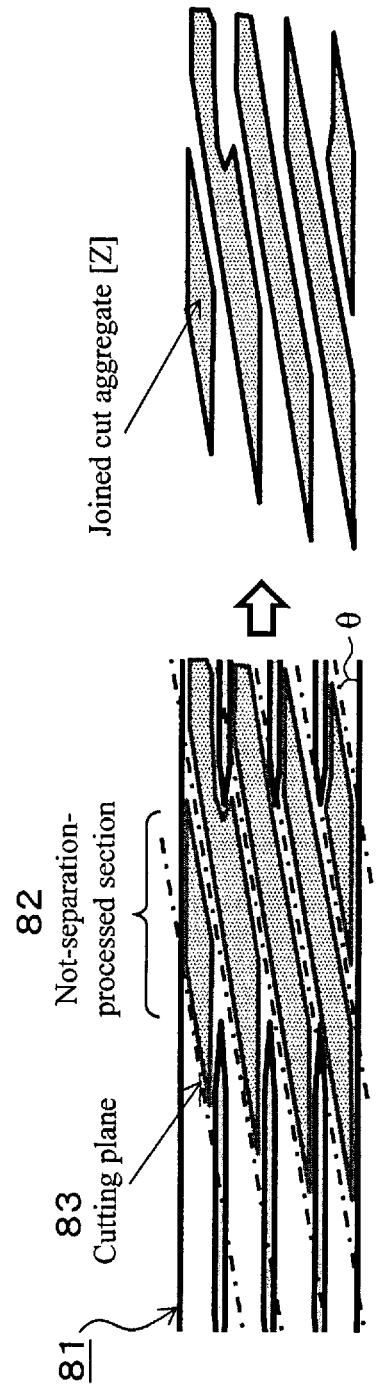
FIG. 12 is a schematic plan view showing an example of a method of manufacturing a joined cut aggregate [Z].

Further, the above-described joined cut aggregate [Z] is, for example, as shown in FIG. 12, formed as a joined cut aggregate [Z] small in width and having a relatively large average fiber bundle length in which the end portion in the lengthwise direction is further narrower in width, by being cut at cutting planes 83 oblique with respect to the lengthwise direction of the fiber bundle at a cutting angle θ (preferably, 3°≤θ≤30°) to contain mainly the not-separation-processed section 82 of the partially separated fiber bundle 81 or obliquely traverse the not-separation-processed section 82 over the entire length thereof. In the illustrated example, the not-separation-processed section 82 and the cutting plane 83 at the time of cutting of the partially separated fiber bundle [B] 81 intersect each other, and the joining of single fibers of the fiber bundle 81 to each other is cut off at the intersected part.

In the above-described joined cut aggregate [Z], since the average length of the fiber bundle becomes relatively long, at the time of cutting of the fiber bundle or at the time of scattering the aggregates, there is a possibility that cracks are naturally generated even in the not-separation-processed section and aggregates having a smaller number of single fibers may be formed. Such aggregates made into smaller in width are also included in the above-described joined cut aggregate [Z].

The chopped fiber bundle [A] comprising the bundled aggregate of discontinuous reinforcing fibers can employ a formation containing at least one kind of aggregate selected from the above-described separated bundle aggregate [X], joined bundle aggregate [Y] and joined cut aggregate [Z]. In the above-described chopped fiber bundle [A], it is preferred that the content of the joined bundle aggregates [Y] is 0 to 15%, from the viewpoint of exhibiting more excellent mechanical properties and lower variation thereof. The content indicates a frequency rate of the joined bundle aggregate [Y] occupied in the chopped fiber bundle [A]. Namely, when the total number of chopped fiber bundles [A] is referred as N(A) and the number of joined bundle aggregates [Y] contained therein is referred as N(Y), it is expressed by equation (2).

$$\{N(Y)/N(A)\} \times 100 \qquad (2)$$

When producing a fiber-reinforced resin molding material containing the above-described chopped fiber bundle [A], it is desired that the partially separated fiber bundle [B] is cut to satisfy equation (1) when the above-described chopped fiber bundle [A] is obtained.

$$W \cdot \cos \theta / D \geq 3 \qquad (1)$$

W: width of fiber bundle when cutting partially separated fiber bundle

D: distance between cutting planes in chopped fiber bundle [A]

Figure 13:
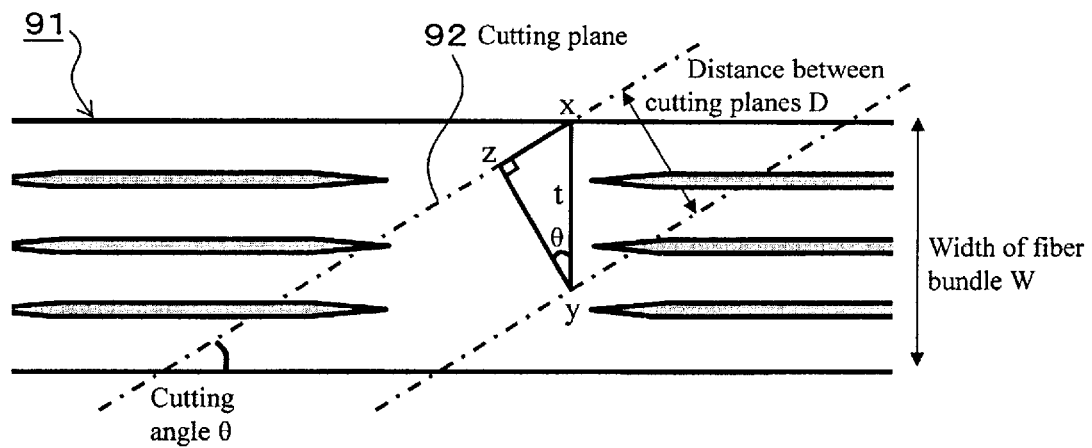
FIG. 13 is a schematic plan view explaining equation (1).

For example, as shown in FIG. 13, when the cutting angle is referred as θ, the width of the fiber bundle at the time of cutting of the partially separated fiber bundle [B] 91 is referred as W, and the distance between the cutting planes 92 is referred as D, the length t of the side "xy" in Δxyz is $$t = D / \cos \theta$$

and the number W/t for cutting the width W of the fiber bundle by the cutting planes in the width direction is desired as $$W/t \geq 3,$$

wherein equation (1) stands from the above-described equation. It is preferred to cut the partially separated fiber bundle to satisfy equation (1), because the joined cut aggregate [Z] is effectively made into smaller in width to contribute to improvement of the mechanical properties.

From equation (1), it is understood that it is effective to increase W (widen the fiber bundle width) to cut the joined bundle aggregate [Y] into small pieces. At this time, because by increasing W, the thickness of the chopped fiber bundle [A] obtained by cutting is reduced, the flatness of the chopped fiber bundle [A] can be increased and, therefore, because stress concentration at the end portion of the chopped fiber bundle [A] in the molded article is alleviated and the uniformity of the distribution of the chopped fiber bundle [A] and the matrix resin is improved, it is preferred also from the viewpoint of easily exhibiting excellent mechanical properties. However, if the value of W is too large, there is a possibility that the gathering power of the single fibers forming the fiber bundle decreases, and when cutting the partially separated fiber bundle, the form as a chopped fiber bundle cannot be maintained, breakage of single fibers is liable to occur and, therefore, when made into a fiber-reinforced resin molding material containing the aforementioned random mat and a matrix resin, the flowability may be lowered during molding thereof. Therefore, W is preferably 5 mm≤W≤100 mm, more preferably 5 mm≤W≤50 mm. Further, it is also good to reduce the cutting angle θ. However, there is a limit from the bundle form retention and processability. Further, to satisfy equation (1), although it can be controlled also by the distance D of the cutting planes, because there is a possibility that the fiber length may fluctuate, it is good to basically set D as a fixed value to be able to cut at a target fiber length.

Thus, by having the chopped fiber bundle [A] comprising the specific bundled aggregate of discontinuous reinforcing fibers formed by cutting the partially separated fiber bundle [B] prepared by alternately forming separation-processed sections and not-separation-processed sections obliquely with respect to the lengthwise direction of the fiber bundle, while the flowability during molding can be improved, extremely high mechanical properties (strength, elastic modulus) when made into a molded article can be realized, and variations in the mechanical properties can be suppressed to be small.

Next, several examples of the chopped fiber bundle [A] obtained by cutting the above-described partially separated fiber bundle [B] will be explained with reference to the drawings.

Figure 14:
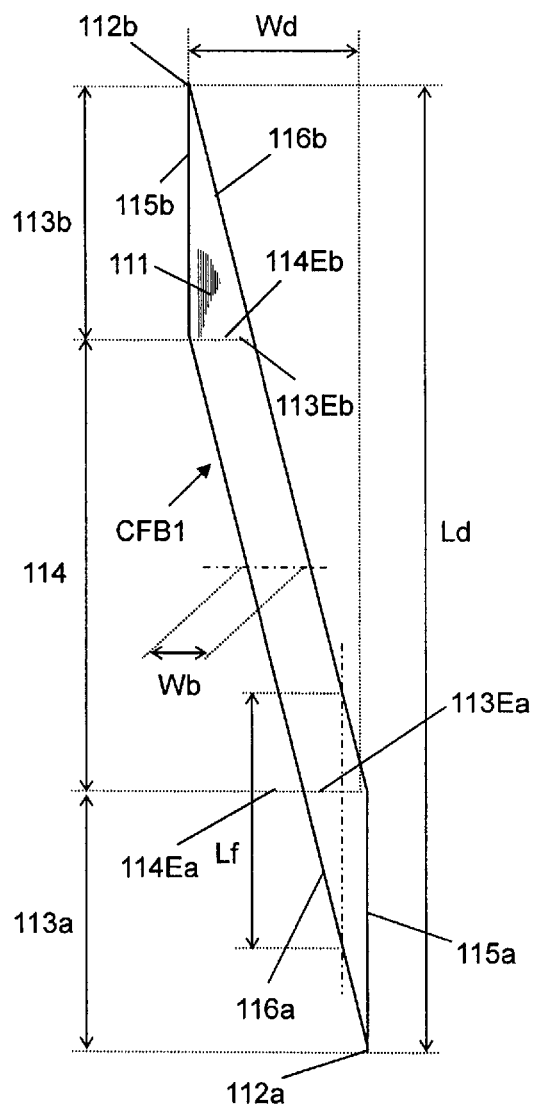
FIG. 14 is a schematic plan view showing an example of a chopped fiber bundle [A].

FIG. 14 is a plan view of an example of the chopped fiber bundle [A]. In FIG. 14, the chopped fiber bundle [A] CFB1 comprises a large number of reinforcing fibers 111 arranged in one direction and a sizing agent (not shown) for collecting the large number of reinforcing fibers 111 as a bundle. The fiber length Lf of each reinforcing fiber 111 is, for example, 5 to 100 mm.

The chopped fiber bundle [A] CFB1 has a first transition section 113a in which the number of the reinforcing fibers in a cross section of the fiber bundle in a direction perpendicular to the arrangement direction of the reinforcing fibers 111 (the lengthwise direction of the fiber bundle before cutting, which is the same in the following) is increased from a first tip 112a which is one tip in the arrangement direction of the reinforcing fibers 111 toward a second tip 112b which is the other tip. Further, it has a second transition section 113b in which the number of the reinforcing fibers in the cross section of the fiber bundle is increased from the second tip 112b toward the first tip 112a.

In FIG. 14, the arrangement direction of the reinforcing fibers 111 is depicted in the vertical direction of the figure. The arrangement direction of reinforcing fibers 111 is also the lengthwise direction of chopped fiber bundle [A] CFB1. In FIG. 14, the direction perpendicular to the arrangement direction of the reinforcing fibers 111 is depicted in the left/right direction of the figure. The direction perpendicular to the arrangement direction of the reinforcing fibers 111 is also the width direction of the chopped fiber bundle [A] CFB1.

Between the first transition section 113a and the second transition section 113b, along the arrangement direction of the reinforcing fibers 111, an unchanging section 114 in which the number of reinforcing fibers 111 in the cross section of the fiber bundle is invariable is provided. One end surface 114Ea of the unchanging section 114 coincides with a first terminal end surface 113Ea, which is the terminal end at a side opposite to the first tip 112a of the first transition section 113a. Further, the other end surface 114Eb of the unchanging section 114 coincides with the second terminal end surface 113Eb, which is the terminal end at a side opposite to the second tip 112b of the second transition section 113b.

In the chopped fiber bundle [A] CFB1, the change amount of the total cross-sectional area of the reinforcing fibers in the cross section of the fiber bundle between the first tip 112a and the second tip 112b is set at 0.05 mm² or less per a length of 1 mm in the arrangement direction of the reinforcing fibers 111.

FIG. 14 is a plan view in which a state in which the width in the direction perpendicular to the arrangement direction of the reinforcing fibers 111 of the chopped fiber bundle [A] CFB1 becomes the maximum is depicted. The chopped fiber bundle [A] CFB1 has the maximum width Wb in the entire area of the unchanging section 114. In the position (section) having the maximum width Wb, the number of reinforcing fibers 111 is maximized.

In FIG. 14, each of the sides 115a, 115b from the tip to the terminal end in the outer shape of the transition section of both the first transition section 113a and the second transition section 113b is formed with a straight line segment along the arrangement direction of the reinforcing fibers 111, and each of the other sides 116a, 116b is formed with a straight line segment in which the cut ends of a number of reinforcing fibers 111 cut when the chopped fiber bundle [A] CFB1 is manufactured are aligned.

The distance in the width direction of the chopped fiber bundle [A] CFB1 between the side 115a and the side 115b of the chopped fiber bundle [A] CFB1 is the passing width Wd of the chopped fiber bundle [A] CFB1, and the distance in the lengthwise direction of the chopped fiber bundle [A] CFB1 between the first tip 112a and the second tip 112b is the passing length Ld of the chopped fiber bundle [A] CFB1.

Figure 15:
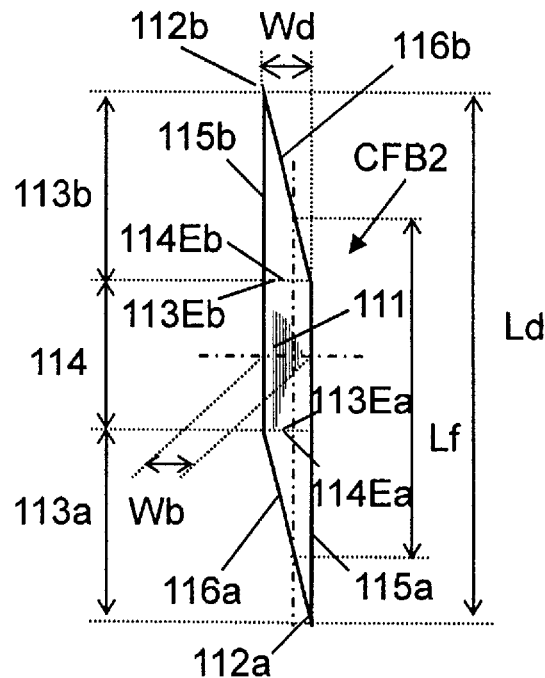
FIG. 15 is a schematic plan view showing another example of a chopped fiber bundle [A].

FIG. 15 is a plan view of another example of the chopped fiber bundle [A]. In FIG. 15, the chopped fiber bundle [A] CFB2 has a similar form to the chopped fiber bundle [A] CFB1 in FIG. 14. Therefore, each part of the chopped fiber bundle [A] CFB2 in FIG. 15 is given with the same symbol as that of the part corresponding to that of the chopped fiber bundle [A] CFB1 in FIG. 14.

The difference between the chopped fiber bundle [A] CFB2 of FIG. 15 and the chopped fiber bundle [A] CFB1 of FIG. 14 is in that the width Wb of the chopped fiber bundle [A] in the unchanging section 114 of the chopped fiber bundle [A] CFB2 in FIG. 15, that is, the passing width Wd of the chopped fiber bundle [A] CFB2 is narrower than the passing width Wd of the chopped fiber bundle [A] CFB1 in FIG. 14. As a result, the length of the side 116a where the cut ends of the multiple reinforcing fibers 111 in the first transition section 113a of the chopped fiber bundle [A] CFB2 in FIG. 15 are arranged is shorter than the length of the side 116a of the chopped fiber bundle [A] CFB1 in FIG. 14, and the length of the side 116b where the cut ends of the multiple reinforcing fibers 111 in the second transition section 113b of the chopped fiber bundle [A] CFB2 in FIG. 15 are arranged is shorter than the length of the side 116b of the chopped fiber bundle [A] CFB1 in FIG. 14.

The fiber length Lf of each reinforcing fiber 111 in the chopped fiber bundle [A] CFB2 is 5 to 100 mm in this example. In the chopped fiber bundle [A] CFB2, the change amount of the total cross-sectional area of the reinforcing fibers in the cross section of the fiber bundle between the first tip 112a and the second tip 112b is 0.05 mm² or less per a length of 1 mm in the arrangement direction of the reinforcing fibers 111.

Figure 16:
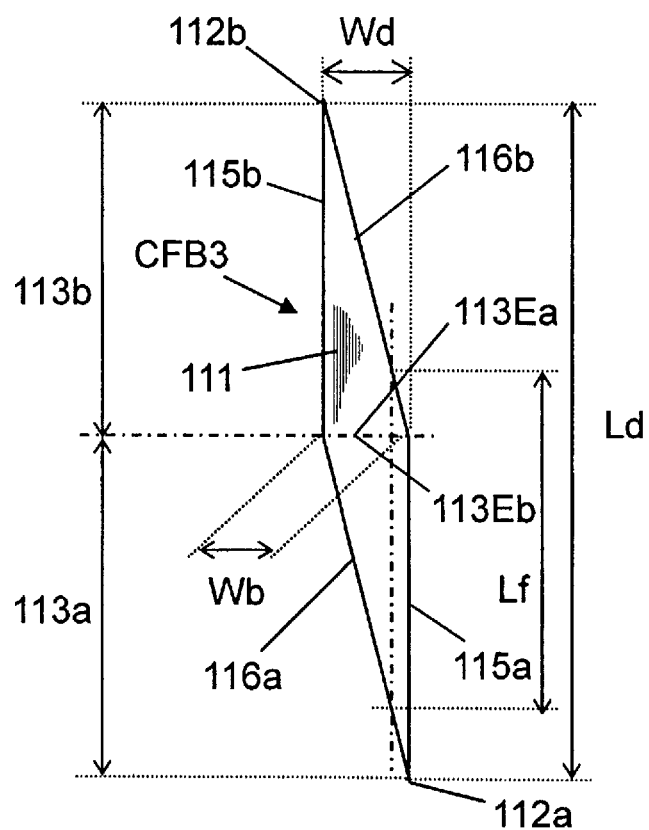
FIG. 16 is a schematic plan view showing still another example of the chopped fiber bundle [A].

FIG. 16 is a plan view showing a further example of the chopped fiber bundle [A]. In FIG. 16, the chopped fiber bundle [A] CFB3 has the same formation as that of the chopped fiber bundle [A] CFB1 in FIG. 14 except a point in that it does not have the unchanging section 114 of the chopped fiber bundle [A] CFB1 in FIG. 14. Therefore, each part of the chopped fiber bundle [A] CFB3 in FIG. 16 is given with the same symbol as that of the part corresponding to that of the chopped fiber bundle [A] CFB1 in FIG. 14.

The chopped fiber bundle [A] CFB3 in FIG. 16 comprises a first transition section 113a in which the number of reinforcing fibers 111 increases from the first tip 112a toward the second tip 112b and a second transition section 113b in which the number of reinforcing fibers 111 increases from the second tip 112b toward the first tip 112a. In the chopped fiber bundle [A] CFB3, the first terminal end surface 113Ea, which is the terminal end at a side opposite to the first tip 112a of the first transition section 113a, and the second terminal end surface 113Eb, which is the terminal end at a side opposite to the second tip 112b of the second transition section 113b, directly coincide with each other.

The chopped fiber bundle [A] CFB3 has a maximum width Wb at a portion where the both terminal end surfaces 113Ea and 113Eb coincide with each other. In the position (section) having the maximum width Wb, the number of reinforcing fibers 111 is maximized. Further, since these both terminal end surfaces 113Ea and 113Eb coincide with each other, the value of the passing length Ld of the chopped fiber bundle [A] CFB3 is twice the value of the length Lf of the reinforcing fiber 111.

The fiber length Lf of each reinforcing fiber 111 in the chopped fiber bundle [A] CFB3 is 5 to 100 mm in this example. In the chopped fiber bundle [A] CFB3, the change amount of the total cross-sectional area of the reinforcing fibers in the cross section of the fiber bundle between the first tip 112a and the second tip 112b is set to 0.05 mm² or less per 1 mm in the arrangement direction of the reinforcing fibers 111.

Although as the cross-sectional shape of the chopped fiber bundle [A] in the direction perpendicular to the lengthwise direction, various shapes such as a circle, an ellipse or a square can be employed, from the viewpoints of stability of the cross-sectional shape of the chopped fiber bundle, good handling of the chopped fiber bundle, and ease of manufacture of the chopped fiber bundle, the cross-sectional shape of the chopped fiber bundle is preferably a circle, an ellipse or a square, and particularly preferably it is a flat rectangle or a flat ellipse.

FIGS. 17(a)-17(g) show a list of the respective plan views ((a) to (g)) of other seven examples of the chopped fiber bundle [A]. Each chopped fiber bundle [A] in FIGS. 17(a)-17(g) comprises a number of reinforcing fibers 111 aligned in the vertical direction in the figures and collected as a bundle by a sizing agent.

The chopped fiber bundle [A] CFB5a in FIG. 17(a) has four tips on the upper side and four tips on the lower side, and has a V-shaped notch between adjacent tips. The outer shape of the chopped fiber bundle [A] CFB5a consists of 16 sides, and all the sides consist of straight line segments.

The chopped fiber bundle [A] CFB5b in FIG. 17(b) has one tip on the upper side and two tips on the lower side, and has a V-shaped notch between the lower-side two tips. The outer shape of the chopped fiber bundle [A] CFB5b comprises six sides, and each side consists of a straight line segment.

The chopped fiber bundle [A] CFB5c in FIG. 17(c) has one tip on the upper side and one tip on the lower side. The outer shape of the chopped fiber bundle [A] CFB5c comprises four sides, two of which are composed of curved line segments and the other two sides are composed of straight line segments.

The chopped fiber bundle [A] CFB5d in FIG. 17(d) has two tips on the upper side and one tip on the lower side. The outer shape of the chopped fiber bundle [A] CFB5d comprises four sides, of which the side connecting the upper-side two tips consists of a U-shaped curved line segment, the side including the lower-side tip is consists of a U-shaped curved line segment, and the remaining two sides consist of straight line segments.

The chopped fiber bundle [A] CFB5e in FIG. 17(e) has one tip on the upper side and one tip on the lower side. The outer shape of the chopped fiber bundle [A] CFB5e comprises two sides, and their sides are composed of outwardly convex curved line segments connecting the upper tip and the lower tip, respectively.

The chopped fiber bundle [A] CFB5f in FIG. 17(f) has one tip on the upper side and one tip on the lower side. The outer shape of the chopped fiber bundle [A] CFB5f comprises six sides, and each side consists of a straight line segment.

The chopped fiber bundle [A] CFB5g in FIG. 17(g) has one tip on the upper side and one tip on the lower side. The outer shape of the chopped fiber bundle CFB5g comprises four sides, and each side consists of a straight line segment.

The chopped fiber bundle [A] is used to manufacture a molding material for molding a fiber reinforced molded body (fiber reinforced plastic). This molding material comprises aggregates of a large number of the aforementioned chopped fiber bundles [A]. When a molded body having a complicated shape is formed by using this molding material, a good molding followability to the complicated shape is required. When the fiber length Lf of all the reinforcing fibers 111 contained in the chopped fiber bundles [A] is set to 100 mm or less, the molding material comprising a number of the chopped fiber bundles [A] has a good molding followability.

When the fiber length Lf exceeds 100 mm, as the fiber length becomes longer, the reinforcing fibers 111 hardly flow in the arrangement direction thereof in the molding process of a molded body, and it becomes difficult to produce a molded body having a complicated shape. When the fiber length Lf is less than 5 mm, although the flowability of the reinforcing fibers 111 in the molding process of a molded body is improved, the mechanical properties of the molded body to be obtained decrease. More preferably, the length Lf of each reinforcing fiber 111 in the chopped fiber bundle [A] is 10 to 50 mm from the relationship between the flowability of the reinforcing fibers in the molding process of the molded body and the mechanical properties of the obtained molded body.

The smaller the number of reinforcing fibers with a fiber length less than 5 mm contained in the chopped fiber bundle [A] is, the better it is, and it is preferably less than 5% of the total number of reinforcing fibers forming the chopped fiber bundle. Namely, the condition where the fiber length Lf of reinforcing fibers 111 forming a chopped fiber bundle is 5 to 100 mm includes a condition where the number of reinforcing fibers having a fiber length less than 5 mm is 5% or less of the total number of reinforcing fibers forming the chopped fiber bundle and the fiber length of all reinforcing fibers is 100 mm or less.

Generally, a fiber reinforced plastic (hereinafter, also referred to as "short fiber reinforced plastic") is produced by molding a molding material comprising aggregates of a large number of chopped fiber bundles. When a load is applied to the fiber reinforced plastic, most of the load is to be received by the reinforcing fibers present in the fiber reinforced plastic. In a chopped fiber bundle, the multiple reinforcing fibers forming it are in a state of being cut with a certain length. Therefore, the load having been received by the reinforcing fibers of a certain chopped fiber bundle should be delivered from the end portion of the chopped fiber bundle via a matrix resin to the reinforcing fibers of another chopped fiber bundle located nearby at the end portion of the chopped fiber bundle.

In the chopped fiber bundle [A], by making the number of reinforcing fibers forming the chopped fiber bundle [A] smaller at both end portions of the chopped fiber bundle [A] than at the center thereof, the load assigned to the chopped fiber bundle [A], which is the largest at the central portion of the chopped fiber bundle [A], is gradually delivered to chopped fiber bundles positioned nearby, little by little, towards the end portions of the chopped fiber bundle [A] through the reinforcing fibers whose number is decreasing and, therefore, in the fiber reinforced plastic comprising the chopped fiber bundles [A], stress concentration is unlikely to occur.

Therefore, in the chopped fiber bundle [A], compared to a conventional chopped fiber bundle in which all the reinforcing fibers are cut at the same position, the strength of the fiber reinforced plastic to be obtained is remarkably improved. Not only that, because stress concentration does not occur, initial damage (crack) is unlikely to occur. In fiber reinforced plastics applications, there are some applications that cannot be applied because sounds are caused by initial damage and induce anxiety, but even in such applications, the fiber reinforced plastic comprising the chopped fiber bundle [A] (the fiber reinforced plastic) becomes possible to be used. Further, although initial damage largely affects fatigue strength, in the fiber reinforced plastic, because initial damage is small, not only static strength but also fatigue strength is greatly improved. In addition, since the chopped fiber bundle [A] is obtained by cutting the partially separated fiber bundle [B], the stress concentration is further made less likely to occur.

With respect to the increase in the number of reinforcing fibers 111 in the transition sections 113a and 113b of the chopped fiber bundle [A], when there are increases in the number of reinforcing fibers 111 at least at two places in the transition sections 113a and 113b and the maximum value of the total cross-sectional area of reinforcing fibers in the cross section of the chopped fiber bundle [A] at the number increasing places is 0.008 mm$^2$ or less, the increase in the number of reinforcing fibers 111 in the transition sections 113a and 113b can be said to be a continuous increase. It is preferred that the total cross-sectional area of the reinforcing fibers in the cross section of the chopped fiber bundle [A] in the above-described number increasing places is 0.002 mm$^2$ or less, from the viewpoint that the more smoothly the number of reinforcing fibers is increased, the more unlikely the above-described stress concentration is to occur.

Over the entire range in the lengthwise direction of the chopped fiber bundle [A] including transition sections 113a and 113b in which the number of reinforcing fibers 111 actually changes (the entire range of the passing length Ld), the change amount of the total cross-sectional area of reinforcing fibers is set at 0.05 mm² or less per a length of 1 mm. By provision of this change amount, the above-described stress concentration can be effectively prevented. This change amount is preferably 0.04 mm² or less per a length of 1 mm, more preferably 0.025 mm² or less.

The total cross-sectional area of reinforcing fibers at an arbitrary position in the chopped fiber bundle [A] is the total sum obtained by adding the cross-sectional areas of respective reinforcing fibers of all reinforcing fibers existing in a plane (cross section) orthogonal to the arrangement direction of the reinforcing fibers.

FIGS. 18(a)-18(c) show a plan view (a) of the chopped fiber bundle [A] CFB2 of FIG. 15, a side view (b), and a graph (c) showing the state of increase/decrease in number of reinforcing fibers 111 in the arrangement direction of the reinforcing fibers 111 of the chopped fiber bundle [A] CFB2. In the graph of FIG. 18(c), the horizontal axis X represents the position in the passing length Ld of the chopped fiber bundle [A] CFB2, and the vertical axis Y represents the number of the reinforcing fibers 111 or the total cross-sectional area of the reinforcing fibers 111.

As shown in the graph of FIG. 18(c), the number of reinforcing fibers 111 of the chopped fiber bundle [A] CFB2 continuously increases from the first tip 112a toward the first terminal end surface 113Ea of the first transition section along the lengthwise direction of the chopped fiber bundle [A] CFB2, and becomes a constant value at the first terminal end surface 113Ea. This constant value is maintained in the unchanging section 114 from the first terminal end surface 113Ea to the second terminal end surface 113Eb of the second transition section. The number of reinforcing fibers 111 then decreases continuously from the second terminal end surface 113Eb toward the second tip 112b along the lengthwise direction of the chopped fiber bundle [A] CFB2. The number of reinforcing fibers 111 in the unchanging section 114 is the maximum value of the number of reinforcing fibers 111 in the chopped fiber bundle [A] CFB2.

FIGS. 19(a)-19(c) show a plan view (a) of the chopped fiber bundle [A] CFB3 of FIG. 16, a side view (b), and a graph (c) showing the state of increase/decrease in number of reinforcing fibers 111 in the arrangement direction of the reinforcing fibers 111 of the chopped fiber bundle [A] CFB3. In the graph of FIG. 19(c), the horizontal axis X represents the position in the passing length Ld of the chopped fiber bundle [A] CFB3, and the vertical axis Y represents the number of the reinforcing fibers 111 or the total cross-sectional area of the reinforcing fibers 111.

As shown in the graph of FIG. 19(c), the number of reinforcing fibers 111 of the chopped fiber bundle [A] CFB3 continuously increases from the first tip 112a toward the first terminal end surface 113Ea of the first transition section along the lengthwise direction of the chopped fiber bundle [A] CFB3. The chopped fiber bundle [A] CFB3 does not have an unchanging section in which the number of reinforcing fibers is maintained at a constant value in the lengthwise direction of the fiber bundle, and the first terminal end surface 113Ea and the second terminal end surface 113Eb of the second transition section 113b coincide with each other and, therefore, the number of reinforcing fibers 111 in the first terminal end surface 113Ea (second terminal end surface 113Eb) indicates the maximum value. The number of reinforcing fibers 111 then decreases continuously from the second terminal end surface 113Eb toward the second tip 112b along the lengthwise direction of the chopped fiber bundle [A] CFB3.

The change in the number of reinforcing fibers in the lengthwise direction of the chopped fiber bundle [A] has two formations: the first formation in which it becomes a constant value after the increase, and decreases thereafter, and the second formation in which after the increase, it decreases without having a constant value.

In the chopped fiber bundle [A], the change amount CFTS of the total cross-sectional area FTS of the reinforcing fiber 111 in the cross section of the chopped fiber bundle [A] between the first tip 112a and the second tip 112b (exemplified in FIGS. 18(a)-18(c) and 19(a)-19(c)) is 0.05 mm² or less per a length of 1 mm in the arrangement direction of the reinforcing fibers 111. The total cross-sectional area FTS of the reinforcing fibers 111 in the cross section of the chopped fiber bundle [A] is the total sum of the cross sectional areas of the respective reinforcing fibers 111 existing in the cross section.

When the cross-sectional areas of respective reinforcing fibers 111 present in the cross section of the chopped fiber bundle [A] vary in a range of ±10% or less relative to the cross-sectional area of the representative reinforcing fiber selected among them, as the total cross-sectional area FTS of the reinforcing fibers 111, a value obtained by multiplying the number of reinforcing fibers 111 present in the cross section by the cross-sectional area of the representative reinforcing fiber is used. Further, when the maximum width Wb of the chopped fiber bundle is less than 3 mm, as the change amount CFTS of the total cross-sectional area FTS of the reinforcing fiber, a value obtained by dividing the maximum value of the total cross-sectional area FTS of the reinforcing fibers 111 in the chopped fiber bundle [A] by the length (mm) of the transition sections 113a and 113b in the arrangement direction of the reinforcing fibers is used.

FIGS. 14 to 17(g) show various examples of the chopped fiber bundle [A]. Any of these chopped fiber bundles [A] has a transition section in which the number of reinforcing fibers increases and the change amount of total cross-sectional area of reinforcing fibers is 0.05 mm² or less per 1 mm in the arrangement direction of the reinforcing fibers over the entire range of the lengthwise direction of the chopped fiber bundle. In the chopped fiber bundle [A], the maximum value of the total cross-sectional area of reinforcing fibers is preferably 0.1 mm² or more.

The state in which the number of reinforcing fibers increases from the tip to the terminal end of the transition section of the chopped fiber bundle [A] can be expressed conversely as a state in which the number of reinforcing fibers decreases from the central portion of the chopped fiber bundle toward the tip of the chopped fiber bundle. By this decreasing state of the number of reinforcing fibers, the above-described occurrence of stress concentration in the fiber reinforced plastic is prevented. This decreasing state of the number of reinforcing fibers is preferably a formation in which the number of reinforcing fibers gradually decreases, that is, continuously decreases. If the chopped fiber bundle is thicker, the number of reinforcing fibers is larger, and the total cross-sectional area of reinforcing fibers is larger, the effect of preventing the occurrence of stress concentration is more improved. The larger the total cross-sectional area of the reinforcing fibers is, the larger the load born by one chopped fiber bundle in the fiber reinforced plastic becomes, but even if the load to be born is large, the state of being delivered with the load at a stroke to the end portion of an adjacent chopped fiber bundle through a matrix resin can be prevented by the state decreased with the number of reinforcing fibers in the transition section. Namely, the transmission of the load between adjacent chopped fiber bundles

[A] is gradually performed by the decreasing state of the number of reinforcing fibers in the transition section, and the stress concentration at the end portion of the chopped fiber bundle [A] can be prevented.

When a chopped fiber bundle [A] is produced, production of a thicker chopped fiber bundle is more excellent in processability and the production cost also becomes lower. However, when a conventional chopped fiber bundle cut in a direction orthogonal to the lengthwise direction of a fiber bundle is made as a thick chopped fiber bundle, the conventional short fiber reinforced plastic molded using this thick chopped fiber bundle is low in strength. Therefore, this short fiber reinforced plastic has a problem that it is difficult to be applied to a member for strength.

Even if the chopped fiber bundle [A] is a thick chopped fiber bundle, the short fiber reinforced plastic formed by using it has a high strength compared to a conventional short fiber reinforced plastic formed by using a conventional thick chopped fiber bundle. Therefore, it is possible to lower the production cost of the chopped fiber bundle, and it also becomes possible to produce a short fiber reinforced plastic having a high strength. From the viewpoint of a thick chopped fiber bundle, the maximum value of the total cross-sectional area of the reinforcing fibers is preferably 0.2 $mm^2$ or more. From the viewpoint of the degree of freedom of thickness design when made into a fiber reinforced plastic, the maximum value of the total cross-sectional area of the reinforcing fibers is preferably 30 $mm^2$ or less, more preferably 5 $mm^2$ or less.

On the other hand, when the maximum value of the total cross-sectional area of reinforcing fibers is less than 0.1 $mm^2$, it is preferred that the change amount of the number of reinforcing fibers is 30% or less of the maximum number of reinforcing fibers (the maximum value of the number) per 1 mm in the arrangement direction of the reinforcing fibers over the entire range of the chopped fiber bundle [A]. When the maximum value of the total cross-sectional area of reinforcing fibers is less than 0.1 $mm^2$, namely, even if it is a thin chopped fiber bundle [A], compared to the formation that a load is released at a stroke as in the conventional chopped fiber bundle, the formation that the number of reinforcing fibers gradually decreases from the central portion of the chopped fiber bundle toward the tip is preferable because the transmission of a load in the fiber reinforced plastic is gradually performed.

In the chopped fiber bundle [A], it is also preferred that the fiber lengths Lf of respective reinforcing fibers 111 are the same. When producing the chopped fiber bundle [A], if the fiber lengths of respective reinforcing fibers are the same since it is possible to produce chopped fiber bundles by cutting a continuous reinforcing fiber bundle at a same interval in the lengthwise direction, the production efficiency of the chopped fiber bundles is good, and when integrating a number of chopped fiber bundles [A] to make a molding material and performing molding of a molded body using this molding material, if the fiber lengths of respective reinforcing fibers are the same, the control of the flow of the reinforcing fibers is easier. Examples of chopped fiber bundles where the fiber lengths of respective reinforcing fibers are the same are shown in FIGS. 14, 15, 16, 17(*a*), 17(*b*), 17(*c*) and 17(*d*).

The condition where f the fiber lengths of respective reinforcing fibers are the same means that reinforcing fibers having a fiber length of ±5% from the average value of the fiber lengths of the reinforcing fibers contained in the chopped fiber bundle [A] occupy 95% of the total reinforcing fibers contained in the chopped fiber bundle.

As the reinforcing fiber used for the chopped fiber bundle [A], the fiber kind is not particularly limited as long as it is a fiber bundle comprising a plurality of reinforcing fibers. For example, there are an organic fiber such as aramid fiber, polyethylene fiber, and polyparaphenylene benzoxadol (PBO) fiber, an inorganic fiber such as glass fiber, carbon fiber, silicon carbide fiber, alumina fiber, tyranno fiber, basalt fiber and ceramic fiber, a metal fiber such as stainless steel fiber s and steel fiber, and as others, boron fiber, natural fiber, and modified natural fiber. Further, it may be a combination of two or more reinforcing fibers of different kinds. Among these fibers, since carbon fiber is lightweight, has excellent specific strength and specific elastic modulus, and further has excellent heat resistance and chemical resistance, it is preferably used as the reinforcing fiber. A molded body (fiber reinforced plastic) produced from chopped fiber bundles comprising carbon fibers is suitably used for a member such as an automobile panel desired with reduction in weight.

In the chopped fiber bundle [A], it is preferred that the reinforcing fiber is a carbon fiber, the number of carbon fibers is 1,000 to 700,000, and over the entire range of the chopped fiber bundle, and the change amount of the number of the carbon fibers is 1,400 or less each time it moves by 1 mm in the arrangement direction of the carbon fibers.

The carbon fiber is preferably a polyacrylonitrile-based carbon fiber that is easy to obtain a high strength. Considering that the diameter of single fiber of easily obtainable carbon fiber is about 5 to 10 μm, it is preferred that the number of carbon fibers in the chopped fiber bundle is 1,000 to 700,000. The number of the carbon fibers is more preferably 1,000 to 100,000. Since a continuous carbon fiber bundle having a high strength and having 6,000 to 50,000 fibers is inexpensive and easy to obtain, it is preferably used when producing the chopped fiber bundle [A]. The continuous carbon fiber bundle as described above is supplied as a yarn wound body (package) wound with the fiber bundle on a bobbin. Although the fiber bundle is preferred to be untwisted, a strand with twists can also be used, and even if twisting occurs during conveyance, it can be applied to our fiber bundles. Further, in using so-called large tow with a large number of single fibers bundled, since the price per unit weight of fiber bundle is inexpensive, as the number of single fibers is larger, the cost of the final product can be reduced preferably. Further, as a large tow, a so-called doubling form in which fiber bundles are wound together in a form of one bundle may be used.

When the reinforcing fiber as described above is used, it is preferred that the reinforcing fiber is subjected to a surface treatment for the purpose of improving the adhesiveness with a matrix resin [M] or the like. As the method for the surface treatment, there are electrolytic treatment, ozone treatment, ultraviolet treatment and the like.

The fiber bundle is preferably in a state of being bundled in advance. The state of being bundled in advance means, for example, a state bundled due to entanglement of reinforcing fibers constituting the fiber bundle with each other, a state bundled by a sizing agent applied to the fiber bundle, and a state bundled due to twists being contained in the production process of the fiber bundle.

If the change amount of the number of reinforcing fibers is not more than 1,400 every time of 1 mm movement in the arrangement direction of reinforcing fibers over the entire range of chopped fiber bundle [A], stress concentration can be effectively prevented in a fiber reinforced plastic. The change amount of the number of reinforcing fibers is preferably 1,000 or less. To improve the strength of the fiber reinforced plastic, the change amount of the number of reinforcing fibers is preferably 600 or less, more preferably 300 or less.

When the maximum width Wb of chopped fiber bundle [A] is less than 3 mm, as the change amount of the number of reinforcing fibers, a value calculated by dividing the maximum value of the number of reinforcing fibers of the chopped fiber bundle [A] by the length of the transition section in the arrangement direction of the reinforcing fibers and proportionally converting it to a change amount per 1 mm is used. In this example, there are increases in the number of reinforcing fibers in at least two places within the transition section, and the number of reinforcing fibers included in the cross section of the chopped fiber bundle [A] at the places where the number of reinforcing fibers increases is preferably 200 or less, and more preferably 50 or less.

In the chopped fiber bundle [A], the ratio Wb/Tb of the maximum width Wb to the maximum thickness Tb is preferably 20 to 400. The ratio Wb/Tb represents the flatness ratio of the chopped fiber bundle. The larger the flatness ratio is, the flatter the chopped fiber bundle is. A flat chopped fiber bundle [A] brings about an increase in the strength of a fiber reinforced plastic. In particular, as the chopped fiber bundle [A] is thicker, that is, the number of single fibers constituting the chopped fiber bundle is larger, the contribution of the flatness ratio to the strength improving effect becomes larger. The value of the maximum thickness Tb is preferably 150 m or less, and more preferably 100 m or less.

A flat chopped fiber bundle [A] can be produced, for example, by opening a continuous reinforcing fiber bundle (for example, a partially separated fiber bundle [B]) drawn out in one direction and then cutting it. This opening of the continuous reinforcing fiber bundle can be carried out, for example, by passing the continuous reinforcing fiber bundle in contact with a roller, vibrating the continuous reinforcing fiber bundle, or performing air blowing to the continuous reinforcing fiber bundle. In performing the opening treatment to the partially separated fiber bundle [B], the opening treatment may be performed by subjecting the fiber bundle to a separation processing, once winding it up as a partially separated fiber bundle [B] and then performing the opening treatment, and alternatively, may be performed in the process of obtaining the partially separated fiber bundle [B]. Particularly, in the process of obtaining the partially separated fiber bundle [B], by performing the opening treatment to the continuous reinforcing fiber bundle and performing a separation processing at a state performed with opening treatment, more uniform separation can be carried out and, further, from the viewpoint that it is possible to reduce the risk of fluffs and yarn breakage occurring at the time of separation processing, it is more preferred to perform the opening treatment in the process of obtaining the partially separated fiber bundle [B]. Further, from the viewpoint of avoiding narrowing of the width of the fiber bundle once opened, it is further preferred to perform the opening treatment in the process of obtaining the partially separated fiber bundle [B], and to subject it to a cutting step without winding it, to obtain a chopped fiber bundle [A].

A particularly preferred formation of the chopped fiber bundle [A] is a formation in which the end portion of the chopped fiber bundle has a side that extends obliquely with respect to the arrangement direction of the reinforcing fibers. A formation is more preferred wherein the oblique side is linearly formed at an angle of 3 to 30° with respect to the arrangement direction of the reinforcing fibers.

The chopped fiber bundle [A] having such a formation can be manufactured, for example, by drawing a continuous reinforcing fiber bundle (the partially separated fiber bundle [B]) in one direction, and cutting the continuous reinforcing fiber bundle drawn out linearly at an angle of 3 to 30° with respect to the arrangement direction of the reinforcing fibers (the drawing direction of the continuous reinforcing fiber bundle) so that the fiber length of the reinforcing fibers becomes 5 to 100 mm. In this manufacturing method, a flatter chopped fiber bundle [A] can be produced by cutting the continuous reinforcing fiber bundle drawn out in one direction after opening it. Although the conventional chopped fiber bundle has been produced by cutting a continuous reinforcing fiber bundle in the direction perpendicular to the arrangement direction of the reinforcing fibers (the drawing direction of the continuous reinforcing fiber bundle), only by cutting the continuous reinforcing fiber bundle at an angle of 3 to 30° with respect to the arrangement direction of the reinforcing fibers (the drawing direction of the continuous reinforcing fiber bundle), the chopped fiber bundle [A] that enables production of a fiber reinforced plastic having a high strength can be obtained.

The smaller the angle of the side formed by the cut reinforcing fiber arrangement at the end portion of the chopped fiber bundle [A] with respect to the arrangement direction of the reinforcing fibers is, the higher the increasing effect of the strength of the fiber reinforced plastic molded by using it becomes. When the angle is 30° or less, its effect is remarkable. On the other hand, however, the handling ability of the chopped fiber bundle itself is reduced. Further, the smaller the angle between the arrangement direction of the reinforcing fibers and a cutting blade is, the lower the stability in the cutting process becomes. Therefore, the angle is preferably 3° or more. More preferably, the angle is 4 to 25°. It is further preferred that the angle is 5 to 15° in consideration of a good balance between achievement of a high strength of a fiber reinforced plastic and the processability in the manufacturing process of the chopped fiber bundle. The angle here is represented by an absolute value.

The chopped fiber bundles [A] shown in FIGS. 14, 15 and 16 are manufactured by cutting a continuous reinforcing fiber bundle (partially separated fiber bundle [B]) in the lengthwise direction thereof at an identical cutting interval. The chopped fiber bundle [A] CFB1 in FIG. 14 is obtained by cutting a relatively wide continuous reinforcing fiber bundle, and has a formation in which the lengths of the sides 116a and 116b on which the cut ends of the reinforcing fibers 111 are arranged are long. Since the lengths of the sides 116a and 116b are long, the reinforcing fibers are easy to be opened at the time of manufacturing a molding material or molding a molded body using the molding material. Therefore, the thickness of each chopped fiber bundle [A] in the molding material or the molded body is reduced, and the strength of the obtained molded body (fiber reinforced plastic) is easily improved.

The chopped fiber bundle [A] CFB2 in FIG. 15 is obtained by cutting a continuous reinforcing fiber bundle (partially separated fiber bundle [B]) having a relatively small width, and has a formation in which the lengths of the sides 116a and 116b on which the cut ends of the reinforcing fibers 111 are arranged are short. Since the lengths of the side 116a and 116b are short, the reinforcing fibers are difficult to be spread and excellent in handling of the chopped fiber bundle [A].

The chopped fiber bundle [A] CFB3 shown in FIG. 16 does not have an unchanging section existing in the chopped fiber bundle [A] of FIG. 14 or 15, from the relationship between the cutting angle and the width of the continuous reinforcing fiber bundle when the continuous reinforcing fiber bundle (partially separated fiber bundle [B]) is cut, and comprises substantially only two transition sections 113*a* and 113*b*. In this chopped fiber bundle [A] CFB3, the passing length Ld of the chopped fiber bundle [A] CFB3 is twice the fiber length Lf of the reinforcing fibers 111.

As a cutting means for the continuous reinforcing fiber bundle to manufacture the chopped fiber bundle [A], for example, there is a guillotine cutter or a rotary cutter such as a roving cutter or the like. The continuous reinforcing fiber bundle is inserted into the cutting means and cut in a state in which the lengthwise direction of the continuous reinforcing fiber bundle and the direction of the cutting blade mounted on the cutting means are extended relatively obliquely.

For the manufacture of the chopped fiber bundle [A] CFB5*a* in FIG. 17(*a*), a notched blade is used, for the manufacture of the chopped fiber bundle [A] CFB5*b* in FIG. 17(*b*), a V-shaped blade is used, for the manufacture of the chopped fiber bundle [A] CFB5*c* in FIG. 17(*c*), a streamlined blade is used, and for the manufacture of the chopped fiber bundle [A] CFB5*d* in FIG. 17(*d*), a U-shaped blade is used, respectively. The chopped fiber bundle [A] CFB5*e* in FIG. 17(*e*) is manufactured by cutting a continuous reinforcing fiber bundle obliquely with respect to the lengthwise direction of the continuous reinforcing fiber bundle while applying a sizing agent such as water to the continuous reinforcing fiber bundle, and converging both side portions in the lengthwise direction of the cut piece obtained by the cutting toward both tip portions at a canoe-like form. For manufacture of the chopped fiber bundle [A] CFB5 *f* in FIG. 17(*f*) and the chopped fiber bundle [A] CFB5*g* in FIG. 17(*g*), a plurality of blades having different shapes are used.

The chopped fiber bundle [A] can also be manufactured by applying shearing to a chopped fiber bundle obtained by the conventional chopped fiber bundle manufacturing method and in which the cut ends of the reinforcing fibers are arranged in a direction perpendicular to the lengthwise direction of the chopped fiber bundle, in the thickness direction of the chopped fiber bundle, and forming a transition section in which the number of reinforcing fibers changes. Further, the chopped fiber bundle [A] can also be manufactured by spinning a continuous reinforcing fiber bundle using a pull-cut spinning means. The chopped fiber bundle [A] obtained by pull-cutting has a formation in which reinforcing fibers differing in length in the lengthwise direction of chopped fiber bundle [A] are arranged at both ends of the chopped fiber bundle [A], and by the portions, transition sections are formed.

In the chopped fiber bundle [A], it is preferred that a number of reinforcing fibers forming it contain a sizing agent to maintain the state of the bundle. As the sizing agent, one may be employed that can maintain a number of reinforcing fibers as a state of bundle, and the material of which has no problem in compatibility with a resin used for producing a molded body (fiber reinforced plastic) comprising the chopped fiber bundles [A].

The chopped fiber bundle [A] is manufactured by cutting a continuous reinforcing fiber bundle (partially separated fiber bundle [B]). To this continuous reinforcing fiber bundle, usually, a sizing agent is applied at the stage of manufacturing the continuous reinforcing fiber bundle to improve handling ability of the fiber bundle. Therefore, this sizing agent can be used as it is as a bundling agent for the chopped fiber bundle [A], and in this example, there is an advantage that there is no need to separately prepare another bundling agent.

When the sizing agent is used as the bundling agent, the amount of the sizing agent applied to the reinforcing fibers is preferably 0.1 to 10% by mass, relative to a standard of the mass of the entire chopped fiber bundle [A]. When the same amount of sizing agent as this amount is applied to the continuous reinforcing fiber bundle used for the manufacture of the chopped fiber bundle [A], when cutting the continuous reinforcing fiber bundle, the reinforcing fibers will not break apart from each other, and the shape of the chopped fiber bundle [A] obtained by cutting becomes an intended shape. When the chopped fiber bundle [A] is manufactured from the continuous reinforcing fiber bundle, by a condition where 0.1 to 10 mass % of sizing agent is applied to the continuous reinforcing fibers to be used, the processability in the manufacturing process of the chopped fiber bundle [A] is improved drastically. In addition, the handling ability of the chopped fiber bundle [A] when producing a molding material using the chopped fiber bundle [A] is also improved.

For example, 0.1 to 10 mass % of a sizing agent dissolved or dispersed in a solvent is added to the drawn continuous reinforcing fiber bundle, and after the continuous reinforcing fiber bundle is cut, it is heated to dry the solvent, or after the continuous reinforcing fiber bundle is heated to dry the solvent, it is cut, thereby obtaining the chopped fiber bundle.

As the sizing agent, for example, there are an epoxy resin, a phenol resin, an unsaturated polyester resin, a vinyl ester resin, a polyamide resin, a urethane resin, or a mixed resin obtained by mixing them. These resins are diluted with water, a solvent or the like, and applied to a continuous reinforcing fiber bundle.

A fiber-reinforced resin molding material containing a random mat containing the above-described chopped fiber bundles [A] and a matrix resin [M] contains a large number of aggregates of the above-described chopped fiber bundles [A], and FIG. 20 is a plan view showing an example thereof. In FIG. 20, a fiber-reinforced resin molding material 191 contains a large number of aggregates of the aforementioned chopped fiber bundles CFB (for example, chopped fiber bundle [A] CFB3 shown in FIG. 16). Although the fiber-reinforced resin molding material contains a large number of aggregates of the aforementioned chopped fiber bundles [A], this aggregate may be combined with another base material, for example, a base material composed of a large number of continuous fibers. In any formation, because the fiber-reinforced resin molding material is used for the production of a fiber reinforced plastic, it is preferred that it has a good handling property and a property suitable for pressurization molding such as press molding and drape molding.

The fiber-reinforced resin molding material can be produced, for example, by sandwiching a random mat, obtained by spraying a large number of the aforementioned chopped fiber bundles [A] in a sheet form, with matrix resin sheets from upper and lower sides, to form as a molding material in which a large number of the chopped fiber bundles [A] and a matrix resin are integrated. Such a molding material is usually called an SMC (Sheet Molding Compound) sheet or a stampable sheet.

The amount of the matrix resin [M] in the fiber-reinforced resin molding material is preferably 20 to 75% by mass. When the amount of the matrix resin in the molding material is less than 20% by mass, because the resin amount is small, there is an example where the flowability, which is one of the major characteristics of our molding material, may be impaired. When the amount of the matrix resin in the molding material is more than 75% by mass, because the amount of reinforcing fibers is smaller than the amount of the resin, it becomes difficult to improve the mechanical properties of the resulting fiber-reinforced plastic. The amount of the matrix resin in the molding material is more preferably 35 to 55% by mass.

As the matrix resin [M] used for the fiber-reinforced resin molding material, there is an example where a thermosetting resin is preferable. Since a thermosetting resin has a cross-linked structure, in general, it has a high elastic modulus and an excellent shape stability. In a fiber-reinforced plastic produced by this, a high elastic modulus and a good dimensional stability are exhibited. In the thermosetting resin, the viscosity of the resin can be adjusted to a low viscosity. Therefore, the thermosetting resin which has been adequately adjusted in viscosity can be easily impregnated into the chopped fiber bundle [A]. Further, by appropriately adjusting the viscosity of the thermosetting resin, even in any step of producing a fiber reinforced plastic, a resin can be added as needed. Further, the molding material, in which the resin is in a state of uncured condition at a room temperature, has a flexibility. Therefore, such a molding material is easy to be cut and to follow the shape of a mold, and is excellent in handling ability. Besides, since it is possible to design to impart tackiness at a room temperature, because such a molding material is integrated by merely pressing it with each other or to another base material, it becomes easy to laminate with each other or to another base material to form a laminated material.

As the matrix resin [M] used in the fiber-reinforced resin molding material, there is an example where a thermoplastic resin is preferred. Generally, since a thermoplastic resin has a high toughness, by using a thermoplastic resin as the matrix resin, it is possible to suppress the connection of cracks to each other, which is a weak point of a short fiber reinforced plastic, thereby improving the strength of the short fiber reinforced plastic. In particular, for applications that place importance on impact properties, it is better to use a thermoplastic resin for the matrix resin. Since molding using a thermoplastic resin usually does not accompany a chemical reaction, molding time can be shortened by using a thermosetting resin.

The arrangement direction of the reinforcing fibers of each chopped fiber bundle [A] contained in the random mat may be the same. By laminating a plurality of molding materials having the same arrangement direction of reinforcing fibers, it becomes easy to design a laminate having desired physical properties. It becomes easy to reduce the variation of the mechanical properties of the obtained laminate. Such a molding material is produced by spraying a large number of chopped fiber bundles [A] onto a base material in the form of a sheet so that the arrangement directions of reinforcing fibers of each chopped fiber bundle [A] are the same. As means for spraying respective chopped fiber bundles [A] so that the arrangement directions of reinforcing fibers thereof are the same, for example, there is a slit-shaped nozzle capable of supplying the respective chopped fiber bundles [A] onto a base material at a state where the arrangement directions of reinforcing fibers are directed to a constant direction.

On the other hand, the fiber-reinforced resin molding material 191 in FIG. 20 is composed of an aggregate in which a large number of chopped fiber bundles [A] CFBs are positioned in a state of the reinforcing fibers thereof arranged in random directions. Although a large number of chopped fiber bundles [A] CFBs partially overlap with each other, no definite layer structure is formed. This fiber-reinforced resin molding material 191 can be produced inexpensively compared to producing a molding material having a layered structure while controlling the arrangement direction of reinforcing fibers of chopped fiber bundles [A] and, further, it is an isotropic and easy-to-design molding material.

The fiber-reinforced resin molding material may be formed into a three-dimensional shape such that a random mat containing a large number of the above-described chopped fiber bundles [A] has at least one bent portion in its cross-sectional shape. In molding a fiber reinforced plastic similarly having a three-dimensional shape using the fiber-reinforced resin molding material having a three-dimensional shape, because it is not necessary to greatly flow the chopped fiber bundles [A] during molding, undulation and unevenness of the reinforcing fiber arrangement due to the flow are prevented, and an excellent quality stability can be obtained in an obtained molded article of the fiber reinforced plastic.

The fiber-reinforced resin molding material having a three-dimensional shape can be produced, for example, as follows. An example of a method of producing a molding material comprises the steps of spraying a large number of chopped fiber bundles [A] and a matrix resin [M] onto a molding base material in a sheet-like form to integrate them, and forming the integrated sheet into a three-dimensional shape. For example, a method of producing a molding material comprising the steps of passing a large number of chopped fiber bundles [A] through a slit-shaped nozzle so that the arrangement directions of the reinforcing fibers of the respective chopped fiber bundles [A] are aligned in the same direction, spraying them onto a molding base material having a three-dimensional shape to form a layer comprising a chopped fiber bundle aggregate having the same arrangement directions of reinforcing fibers, and spraying a large number of the chopped fiber bundles [A] onto the previously formed layer in a sheet-like form so that the arrangement directions of the reinforcing fibers of the respective chopped fiber bundles [A] are aligned in different directions of the reinforcing fibers of the chopped fiber bundles [A] in the previously formed layer and so that the arrangement directions of the reinforcing fibers of the respective chopped fiber bundles [A] sprayed later are aligned in the same direction, can be exemplified.

Figure 21:
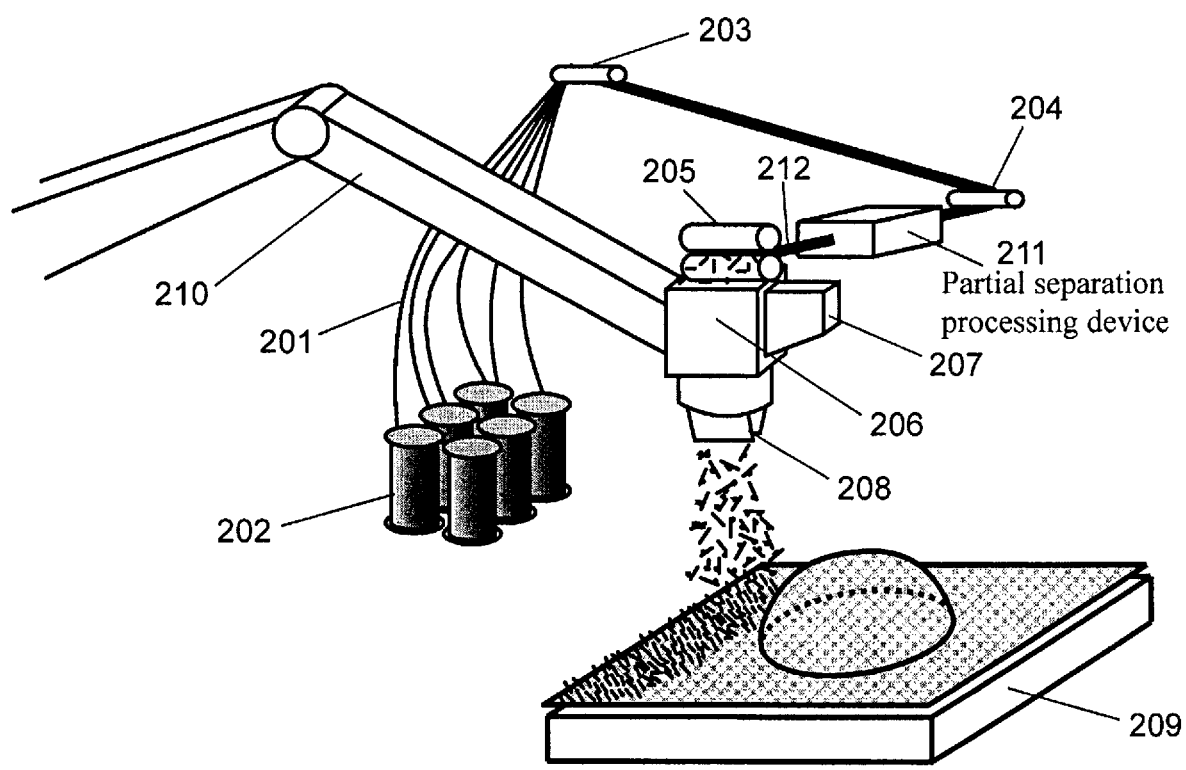
FIG. 21 is a schematic perspective view explaining an example of a method of producing a fiber-reinforced resin molding material.

FIG. 21 is a schematic perspective diagram explaining an example of a method of producing our fiber-reinforced resin molding material having a three-dimensional shape. In FIG. 21, an apparatus that produces a fiber-reinforced resin molding material having a three-dimensional shape comprises, for example, a plurality of bobbins 202 each wound with a continuous reinforcing fiber bundle 201 (in FIG. 21, six bobbins are depicted), guide rollers 203 and 204 for the continuous reinforcing fibers, a roller cutter 205 that pulls out the continuous reinforcing fibers from the bobbins 202, passes the fiber bundle of the continuous reinforcing fibers pulled out through a partial separation processing device 211 that performs a partial separation processing to the fiber bundle, and thereafter, cuts the partially separated fiber bundle [B] 212 at constant intervals and in a direction inclined relative to the lengthwise direction of the fiber bundle of the continuous reinforcing fibers, a sizing agent applying device 206 that applies a sizing agent to the chopped fiber bundle [A] obtained by cutting of the continuous reinforcing fibers, a sizing agent supplying port 207 provided on the side portion of the sizing agent applying device 206, a slit-shaped nozzle 208 that controls the arrangement direction of the reinforcing fibers of the chopped fiber bundle [A] applied with the sizing agent to a predetermined direction, a molding base material 209 comprising a forming mold having a three-dimensional shape, and a robot arm 210.

The roller cutter 205 is attached to the upper portion of the sizing agent applying device 206. The sizing agent applying device 206 has a chopped fiber bundle introducing port that receives the chopped fiber bundle [A] obtained by cutting, at its upper portion, and a chopped fiber bundle discharging port that discharges the chopped fiber bundle [A] applied with the sizing agent, at its lower portion. The slit-shaped nozzle 208 has a chopped fiber bundle introducing port that receives the chopped fiber bundle [A] discharged from the chopped fiber bundle discharging port, at its upper portion, and a chopped fiber bundle discharging port that discharges the chopped fiber bundle [A] in which the arrangement directions of the reinforcing fibers are controlled to a constant direction, at its lower portion. The slit-shaped nozzle 208 is attached to the lower portion of the sizing agent applying device 206. The tip of the robot arm 210 is coupled to the side portion of the sizing agent applying device 206. The tip of the robot arm 210 is movable with respect to the molding base material 209 by a robot arm operating device (not shown).

In FIG. 21, by the rotation of the rollers of the roller cutter 205, the continuous reinforcing fiber bundle 201 pulled out from the bobbins 202 passes through the guide rollers 203 and 204, and passes through the partial separation processing device 211 and, then, a partially separated fiber bundle [B] 212 is introduced into the roller cutter 205 where it is cut to form the chopped fiber bundle [A]. The chopped fiber bundles [A] obtained by cutting are introduced to the sizing agent applying device 206. Inside the sizing agent application device 206, the powdered sizing agent supplied from the sizing agent supplying port 207 is applied to the chopped fiber bundles [A]. The chopped fiber bundles [A] applied with the sizing agent are introduced into the slit-shaped nozzle 208. As the chopped fiber bundles move inside the slit-shaped nozzle 208, the chopped fiber bundles [A] are aligned so that the arrangement direction of the reinforcing fibers becomes a constant direction. The aligned chopped fiber bundles [A] are discharged from the slit-shaped nozzle 208, drop while substantially being maintained with the arrangement state of the chopped fiber bundles, and reach the surface of the molding base material 209.

The arrival position on the surface of the molding base material 209 of the chopped fiber bundles is sequentially changed by the operation of the robot arm 210 and a layer of the chopped fiber bundles [A] adhered with the powdered sizing agent is formed on the molding base material 209. The layer of chopped fiber bundles [A] formed on the molding base material 209 is heated to melt the powdered sizing agent contained therein, and by the molten sizing agent, the chopped fiber bundles are integrated to each other, and the molding material having a three-dimensional shape is produced.

The fiber reinforced plastic molded using the fiber-reinforced resin molding material contains the random mat containing the above-described chopped fiber bundles [A] and a matrix resin [M]. Therefore, in the chopped fiber bundle [A] in the fiber reinforced plastic, the fiber length of the reinforcing fibers forming it is, for example, 5 to 100 mm, and the chopped fiber bundle [A] has transition sections in each of which the number of the reinforcing fibers in the cross section of the chopped fiber bundle [A] increases from each end of the chopped fiber bundle [A] along the arrangement direction of the reinforcing fibers toward the central portion in the lengthwise direction of the chopped fiber bundle [A], and over the entire range of the chopped fiber bundle [A], the change amount of the total cross-sectional area of the reinforcing fibers in the cross section of the chopped fiber bundle [A] is 0.05 $mm^2$ or less per a length of 1 mm.

Since the chopped fiber bundle [A] in such a fiber reinforced plastic has a formation in which the number of reinforcing fibers decreases from the central portion thereof to the end portion, in the fiber reinforced plastic, the load received by the chopped fiber bundle [A] can be gradually delivered to the surrounding chopped fiber bundle [A], thereby effectively reducing the stress concentration. In particular, by the condition where the change amount of total cross-sectional area of reinforcing fibers is 0.05 $mm^2$ or less per 1 mm over the entire range of chopped fiber bundle [A], the stress transmission efficiency is drastically improved. This change amount is preferably 0.04 $mm^2$ or less. To minimize the influence of stress concentration, it is better that this change amount is 0.025 $mm^2$ or less. In carbon fibers having the diameter of a reinforcing fiber (a single fiber) of about 5 to 10 μm, it is better that the change amount of the total number of reinforcing fibers is 1,400 or less per 1 mm over the entire range of chopped fiber bundle [A]. This change amount of the total number is more preferably 1,000 or less. To minimize the influence of stress concentration, the change amount of the total number is preferably 800 or less.

EXAMPLES

Next, Examples and Comparative Examples will be explained. However, this disclosure is not limited in any way by the Examples and Comparative Examples.

Material Used

Fiber bundle [B-1]: A continuous carbon fiber bundle having a fiber diameter of 7.2 m, a tensile elastic modulus of 240 GPa, and a number of single fibers of 50,000 ("PANEX 35 (registered trademark)", supplied by ZOLTEK Co., Ltd.) was used.

Matrix resin [M-1]: A resin compound prepared by sufficiently mixing and stirring 100 parts by weight of a vinyl ester resin ("DELAKEN (registered trademark) 790", supplied by Dow Chemical Co., Ltd.), 1 part by weight of tert-butyl peroxybenzoate ("PERBUTYL (registered trademark) Z", supplied by NOF CORPORATION) as a curing agent, 4 parts by weight of magnesium oxide (MgO #40, supplied by Kyowa Chemical Industry Co., Ltd.) as a thickener, and 2 parts by weight of zinc stearate (SZ-2000, supplied by Sakai Chemical Industry Co., Ltd.) as an internal release agent.

Classification of Chopped Fiber Bundle [A] and Calculation Method of Content of Aggregate [Y]

A sample of 100 mm×100 mm was cut out from the fiber-reinforced resin molding material, and the sample was heated in a furnace at 600° C. for 1 hour to remove the resin. Subsequently, 400 chopped fiber bundles [A] were taken out from the sample from which the resin was removed using tweezers and they were classified into aggregate [X], aggregate [Y] and aggregate [Z] according to the following criteria.

aggregate [X]: In a partially separated fiber bundle, the small bundles divided originating from the applied separation processing were determined as separated bundle aggregates (aggregates [X]).

aggregate [Y]: In a partially separated fiber bundle, one capable of being judged to be "a shape joined with bundles with each other" by inter-bundle joining factors such as not-separation-processed section, entangled part, entanglement accumulation part or the like was determined as joined bundle aggregate (aggregate [Y]).

aggregate [Z]: In a partially separated fiber bundle, one having a trace divided by cutting inter-bundle joining factors such as not-separation-processed section, entangled part, entanglement accumulation part or the like, or one capable of being judged to be made into a small piece by natural thread splitting in the process after being cut, was determined as joined cut aggregate (aggregate [Z]).

Furthermore, the content of aggregate [Y] in the fiber-reinforced resin molding material was calculated from the total number of aggregates [Y] classified as described above.

Evaluation Method of Mechanical Properties

A mold No. 1 capable of producing a flat plate was used. A fiber-reinforced resin molding material was placed in the central portion of the mold No. 1 (50% in terms of charge rate), and then cured under a pressure of 10 MPa by a pressurizing-type press machine at a condition of about 140° C.×5 minutes to obtain a flat plate of 300×400 mm. In a condition where the lengthwise direction of the flat plate was referred to as 0° direction, five pieces (total 10 pieces) of 100×25×1.6 mm specimens were cut out from the directions of 0° and 90°, respectively, from the obtained flat plate, and the measurement was carried out in accordance with JIS K 7074 (1988) (flexural strength [MPa], flexural modulus [GPa], CV (coefficient of variation) of flexural modulus [%]).

Example 1

The fiber bundle [B-1] was unwound at a constant speed of 10 m/min using a winder, passed through a vibration widening roll vibrating in its axial direction at 10 Hz, and after a widening treatment was applied, it was passed through a width regulating roll having a width of 60 mm to obtain a widened fiber bundle widened to 60 mm in width. For the obtained widened fiber bundle, a separation processing means was prepared in which iron plates for separation processing each having a protruding shape with a thickness of 0.2 mm, a width of 3 mm and a height of 20 mm were arranged in parallel to each other at equal intervals of 3.5 mm with respect to the width direction of the reinforcing fiber bundle. This separation processing means was intermittently pierced into and pulled out from the widened fiber bundle to obtain a partially separated fiber bundle. At this time, the separation processing means was pierced into the widened fiber bundle running at a constant speed of 10 m/min for 3 seconds to create a separation-processed section, pulled out therefrom in 0.2 second, and the operation of piercing again was repeated.

In the partially separated fiber bundle obtained, the fiber bundle was divided into 17 parts in the width direction in the separation-processed section, and in at least one end portion of at least one separation-processed section, an entanglement accumulation part, in which entangled parts each tangled with single fibers were accumulated, was present. When the partially separated fiber bundle was manufactured by 1,500 m, the twists of the fibers existing in the fiber bundle passed through in the running direction when pulling out and piercing the separation processing means without causing yarn breakage and winding at all, and the separation processing could be carried out with the stable width.

The obtained partially separated fiber bundle was inserted continuously into a rotary cutter whose cutting blade was inclined at an angle of 15° with respect to the lengthwise direction of the fiber bundle to cut the fiber bundle, and the chopped fiber bundle [A] was obtained. At this time, the cutting interval was adjusted to 6.5 mm in advance so that it could be cut to a fiber length of 25 mm. Further, although the inserted partially separated fiber bundle was widened up to 60 mm width when applying the above-described separation processing process due to the winding process of the partially separated fiber bundle and thread tension applied during cutting process, the width W of the fiber bundle at the time of cutting was 20 mm. The obtained chopped fiber bundle [A] had a shape having an unchanging section 114 and two transition sections 113a and 113b as shown in FIG. 15. At this time, although the change amount of the total cross-sectional area of the reinforcing fibers in the transition section 113a and 113b varies depending on the classification of the form of the chopped fiber bundle [A], it was 0.005 to 0.025 mm² per 1 mm in the lengthwise direction of the chopped fiber bundle.

Following the cutting process described above, the chopped fiber bundles [A] were sprayed to be uniformly dispersed to obtain a random mat whose fiber orientation is isotropic. The areal weight of the obtained discontinuous fiber nonwoven fabric was 1 kg/m².

The matrix resin [M-1] was uniformly applied to respective two sheets of polypropylene release films using a doctor blade to make two resin sheets. A sheet-like fiber-reinforced resin molding material was obtained by nipping the above-described obtained random mat with these two resin sheets and impregnating the resin into the mat by a roller. At this time, the amount of resin application was adjusted at the stage of manufacturing the resin sheets so that the weight content of the reinforcing fibers of the fiber-reinforced resin molding material became 47%.

With respect to the obtained fiber-reinforced resin molding material, when the content of the aggregates [Y] was calculated based on the classification of the chopped fiber bundle [A] and the method of calculating the content of the aggregate [Y], it was 10%. Further, based on the aforementioned evaluation method of mechanical properties, a fiber-reinforced resin molding material was molded and the mechanical properties were evaluated. A series of evaluation results obtained are shown in Table 1.

Example 2

The evaluations were carried out in the same manner as in Example 1 except that the cutting interval was adjusted to 3.2 mm so that the fiber length of the bundled aggregate [A] was 12.5 mm. A series of evaluation results obtained are shown in Table 1.

Example 3

The evaluations were carried out in the same manner as in Example 1 except that the inclination of the cutting blade of the rotary cutter was adjusted and the cutting interval was adjusted to 6.2 mm so that the cutting angle of the fiber bundle became 30° and the fiber length became 12.5 mm. A series of evaluation results obtained are shown in Table 1.

Example 4

The evaluations were carried out in the same manner as in Example 1 except that the width of the partially separated fiber bundle was adjusted so that the width W of the partially separated fiber bundle at the time of cutting became 30 mm, by providing a squeezing roller for maintaining the widened width of the fiber bundle immediately before the winding of the partially separated fiber bundle 1. A series of evaluation results obtained are shown in Table 1.

Comparative Example 1

The evaluations were carried out in the same manner as in Example 1 except that a chopped fiber bundle [A] was obtained by using a rotary cutter with cutting blades installed at an angle of 90° and a cutting interval of 25 mm with respect to the lengthwise direction of the fiber bundle when cutting the partially separated fiber bundle. A series of evaluation results obtained are shown in Table 2.

Comparative Example 2

The evaluations were carried out in the same manner as in Example 1 except that a chopped fiber bundle [A] was obtained by cutting the fiber bundle [B-1] without performing a separation processing thereto. A series of evaluation results obtained are shown in Table 2.

Example 4, we confirmed that by adjusting the width of the fiber bundle at the time of cutting, inter-bundle coupling factors such as not-separation-processed section, entangled part, and entanglement accumulation part can be subdivided, and it had a remarkable effect on improvement of mechanical properties and reduction in variation.

On the other hand, with respect to Comparative Examples 1 and 2, in Comparative Example 1, since the fiber bundle was cut at a cutting angle of 90°, stress concentration occurred at the end portion of the fiber bundle and, further, because the content of aggregates [Y] was high, a decrease in mechanical properties and an increase in variation were observed. Further, in Comparative Example 2, since the separation processing was not performed to the reinforcing fiber bundle, the content of aggregates [Y] was high, a decrease in mechanical properties and an increase in variation were observed.

INDUSTRIAL APPLICABILITY

This disclosure is applicable to any fiber-reinforced resin molding material required to have excellent flowability at the time of molding, high mechanical properties of the molded article and reduction of the variation of its mechanical properties.

TABLE 1

| | | | Example | | | |
| --- | --- | --- | --- | --- | --- | --- |
| | | Unit | 1 | 2 | 3 | 4 |
| Used raw material | Fiber bundle | — | [B-1] | [B-1] | [B-1] | [B-1] |
| | Matrix resin | — | [M-1] | [M-1] | [M-1] | [M-1] |
| Bundled aggregate [A] | Cutting angle θ | ° | 15 | 15 | 30 | 15 |
| | Fiber length | mm | 25 | 12.5 | 12.5 | 12.5 |
| | Width of fiber bundle at cutting W | mm | 20 | 20 | 20 | 30 |
| | Value of W · cos θ/D | — | 3 | 6 | 3 | 9 |
| | Change amount of total cross-sectional area in transition section | mm$^2$/mm | 0.005-0.025 | 0.005-0.025 | 0.023-0.047 | 0.011-0.020 |
| | Content of aggregates [Y] | % | 10 | 9 | 12 | 8 |
| Mechanical properties | Flexural strength | MPa | 415 | 435 | 385 | 450 |
| | Flexural modulus | GPa | 25 | 26 | 23 | 27 |
| | CV of flexural modulus | % | 13 | 10 | 16 | 8 |

TABLE 2

| | | | Comparative Example | |
| --- | --- | --- | --- | --- |
| | | Unit | 1 | 2 |
| Used raw material | Reinforcing fiber | — | [B-1] | [B-1] |
| | Matrix resin | — | [M-1] | [M-1] |
| Bundled aggregate [A] | Cutting angle θ | ° | 90 | 15 |
| | Fiber length | mm | 25 | 25 |
| | Width of fiber bundle at cutting W | mm | 20 | 20 |
| | Value of W · cos θ/D | — | 0 | 3 |
| | Change amount of total cross-sectional area in transition section | mm$^2$/mm | — | 0.027 |
| | Content of aggregates [Y] | % | 30 | 45 |
| Mechanical properties | Flexural strength | MPa | 320 | 385 |
| | Flexural modulus | GPa | 20 | 24 |
| | CV of flexural modulus | % | 27 | 24 |

In Examples 1 to 4, we confirmed that excellent mechanical properties (flexural strength, elastic modulus) and low variation were both exhibited. In Example 3, although it was observed that the mechanical properties were reduced because the stress concentration at the end portion of the fiber bundle was increased by increasing the cutting angle, we confirmed there was no problem in level. Further, in

The invention claimed is:

1. A random mat comprising at least a chopped fiber bundle [A], wherein the chopped fiber bundle [A] satisfies at least (a) to (d):
    (a) the chopped fiber bundle [A] is a bundled aggregate of discontinuous reinforcing fibers obtained by cutting a partially separated fiber bundle [B] prepared by alternately forming separation-processed sections, each of which is separated into a plurality of bundles, and not-separation-processed sections, along a lengthwise direction of a fiber bundle comprising a plurality of reinforcing fibers;
    (b) the chopped fiber bundle [A] has a first transition section in which a number of the reinforcing fibers in a cross section of the fiber bundle in a direction perpendicular to the lengthwise direction of the fiber bundle is increased from a first tip which is one tip in the lengthwise direction of the fiber bundle, toward a second tip which is the other tip, and a second transition section in which the number of the reinforcing fibers in the cross section of the fiber bundle is increased from the second tip toward the first tip;
    (c) between the first transition section and the second transition section, along the lengthwise direction of the fiber bundle, an unchanging section in which the number of the reinforcing fibers in the cross section of the fiber bundle is invariable is provided, and one end surface of the unchanging section coincides with a first terminal end surface which is a terminal end at a side opposite to the first tip of the first transition section and the other end surface of the unchanging section coincides with a second terminal end surface which is a terminal end at a side opposite to the second tip of the second transition section, or the first terminal end surface and the second terminal end surface coincide directly with each other; and (d) a change amount of the total cross-sectional area of the reinforcing fibers in the cross section of the fiber bundle between the first tip and the second tip is 0.05 mm² or less per a length of 1 mm in the lengthwise direction of the fiber bundle, wherein, in the partially separated fiber bundle [B], an entangled part in which the reinforcing fibers are entangled at least at one end of at least one of the separation-processed sections, and/or an entanglement accumulation part in which the entangled parts are accumulated, is formed.

2. A method of producing a random mat according to claim 1, wherein the partially separated fiber bundle [B] is cut at an angle θ (3°≤θ≤30°) with respect to the lengthwise direction of the fiber bundle when obtaining the chopped fiber bundle [A].

3. The method according to claim 2, wherein the partially separated fiber bundle [B] is cut to satisfy equation (1) when obtaining the chopped fiber bundle [A]

$$W \cdot \cos \theta / D \geq 3 \qquad (1)$$

W: width of fiber bundle when cutting partially separated fiber bundle
D: distance between cutting planes in chopped fiber bundle [A].

4. A fiber-reinforced resin molding material comprising a random mat according to claim 1 and a matrix resin [M].

5. The random mat according to claim 1, wherein bundled aggregates of the discontinuous reinforcing fibers obtained by cutting the partially separated fiber bundle [B] are classified into at least aggregates [X] to [Z], and the chopped fiber bundle [A] comprises at least one of the aggregates [X], [Y] and [Z]:

aggregate [X]: a separated bundle aggregate divided into arbitrary number of bundles by separation processing;

aggregate [Y]: a joined bundle aggregate in which the reinforcing fibers of fiber bundles are joined to each other by being formed with the not-separation-processed section, and/or an entangled part in which the reinforcing fibers are entangled at least at one end of at least one of the separation-processed sections, and/or an entanglement accumulation part in which the entangled parts are accumulated; and aggregate [Z]: a joined cut aggregate in which a cutting plane at cutting of the partially separated fiber bundle is intersected with the not-separation-processed section and/or the entangled part and/or the entanglement accumulation part, and at an intersected part, the joining of the reinforcing fibers of fiber bundles to each other is cut.

6. A random mat comprising at least a chopped fiber bundle [A], wherein the chopped fiber bundle [A] satisfies at least (a) to (d):

(a) the chopped fiber bundle [A] is a bundled aggregate of discontinuous reinforcing fibers obtained by cutting a partially separated fiber bundle [B] prepared by alternately forming separation-processed sections, each of which is separated into a plurality of bundles, and not-separation-processed sections, along a lengthwise direction of a fiber bundle comprising a plurality of reinforcing fibers;

(b) the chopped fiber bundle [A] has a first transition section in which a number of the reinforcing fibers in a cross section of the fiber bundle in a direction perpendicular to the lengthwise direction of the fiber bundle is increased from a first tip which is one tip in the lengthwise direction of the fiber bundle, toward a second tip which is the other tip, and a second transition section in which the number of the reinforcing fibers in the cross section of the fiber bundle is increased from the second tip toward the first tip;

(c) between the first transition section and the second transition section, along the lengthwise direction of the fiber bundle, an unchanging section in which the number of the reinforcing fibers in the cross section of the fiber bundle is invariable is provided, and one end surface of the unchanging section coincides with a first terminal end surface which is a terminal end at a side opposite to the first tip of the first transition section and the other end surface of the unchanging section coincides with a second terminal end surface which is a terminal end at a side opposite to the second tip of the second transition section, or the first terminal end surface and the second terminal end surface coincide directly with each other; and (d) a change amount of the total cross-sectional area of the reinforcing fibers in the cross section of the fiber bundle between the first tip and the second tip is 0.05 mm² or less per a length of 1 mm in the lengthwise direction of the fiber bundle, wherein bundled aggregates of the discontinuous reinforcing fibers obtained by cutting the partially separated fiber bundle [B] are classified into at least aggregates [X] to [Z], and the chopped fiber bundle [A] comprises at least one of the aggregates [X], [Y] and [Z]:

aggregate [X]: a separated bundle aggregate divided into arbitrary number of bundles by separation processing;

aggregate [Y]: a joined bundle aggregate in which the reinforcing fibers of fiber bundles are joined to each other by being formed with the not-separation-processed section, and/or an entangled part in which the reinforcing fibers are entangled at least at one end of at least one of the separation-processed sections, and/or an entanglement accumulation part in which the entangled parts are accumulated; and aggregate [Z]: a joined cut aggregate in which a cutting plane at cutting of the partially separated fiber bundle is intersected with the not-separation-processed section and/or the entangled part and/or the entanglement accumulation part, and at an intersected part, the joining of the reinforcing fibers of fiber bundles to each other is cut.

7. The random mat according to claim 6, wherein the content of the joined bundle aggregate [Y] in the bundled aggregates of the discontinuous reinforcing fibers obtained by cutting the partially separated fiber bundle [B] is 0 to 15%.

8. A method of producing a random mat according to claim 7, wherein the partially separated fiber bundle [B] is cut at an angle θ (3°≤θ≤30°) with respect to the lengthwise direction of the fiber bundle when obtaining the chopped fiber bundle [A].

9. A fiber-reinforced resin molding material comprising a random mat according to claim 7 and a matrix resin [M].

* * * * *